United States Patent
Son et al.

(10) Patent No.: US 11,996,912 B2
(45) Date of Patent: May 28, 2024

(54) ELECTRONIC DEVICE FOR COMMUNICATING USING BEAMFORMING, AND OPERATING METHOD THEREFOR

(71) Applicant: Samsung Electronics Co., Ltd., Gyeonggi-do (KR)

(72) Inventors: Dongil Son, Gyeonggi-do (KR); Daehee Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 70 days.

(21) Appl. No.: 17/727,167

(22) Filed: Apr. 22, 2022

(65) Prior Publication Data
US 2022/0247456 A1    Aug. 4, 2022

Related U.S. Application Data

(63) Continuation of application No. PCT/KR2020/012522, filed on Sep. 17, 2020.

(30) Foreign Application Priority Data

Oct. 25, 2019    (KR) .......................... 10-2019-0133541

(51) Int. Cl.
*H04B 7/0426*    (2017.01)
*H01Q 1/02*    (2006.01)
(Continued)

(52) U.S. Cl.
CPC .............. *H04B 7/043* (2013.01); *H01Q 1/02* (2013.01); *H01Q 3/24* (2013.01); *H04B 7/0608* (2013.01); *H04B 7/0802* (2013.01)

(58) Field of Classification Search
CPC .... H04B 7/043; H04B 7/0608; H04B 7/0802; H04B 7/0617; H04B 7/0691;
(Continued)

(56) References Cited

U.S. PATENT DOCUMENTS 9,577,735 B2    2/2017 Lee et al.
2010/0120466 A1    5/2010 Li
(Continued)

FOREIGN PATENT DOCUMENTS

KR    10-2005-0006934    1/2005
KR    10-2011-0091760    8/2011
(Continued)

OTHER PUBLICATIONS

PCT/ISA/210 Search Report issued on PCT/KR2020/012522, dated Dec. 23, 2020, pp. 6.
(Continued)

*Primary Examiner* — Khanh C Tran
(74) *Attorney, Agent, or Firm* — The Farrell Law Firm, P.C.

(57) ABSTRACT

Disclosed is an electronic device for communicating using beamforming, and an operating method therefor, the electronic device including a plurality of antenna modules which are disposed at different locations and which support beamforming, a communication module which transmits and receives a signal through the plurality of antenna modules, at least one processor, and a memory coupled to the at least one processor. The memory may store instructions, when executed, causing the processor to perform a beam search on the plurality of antenna modules, select at least two antenna modules allowing a beam satisfying a specified condition to be formed among the plurality of antenna modules, based on a result of the beam search, and communicate by alternately using the selected at least two antenna modules.

14 Claims, 30 Drawing Sheets

(51) Int. Cl.
*H01Q 3/24* (2006.01)
*H04B 7/06* (2006.01)
*H04B 7/08* (2006.01)

(58) Field of Classification Search
CPC .. H04B 7/0404; H04B 7/0408; H04B 7/0695; H01Q 1/02; H01Q 3/24
See application file for complete search history.

(56) References Cited

U.S. PATENT DOCUMENTS

| | | |
|---|---|---|
| 2011/0250928 A1 | 10/2011 | Schlub et al. |
| 2012/0071203 A1 | 3/2012 | Wong |
| 2016/0026216 A1 | 1/2016 | Novet |
| 2016/0112147 A1* | 4/2016 | Seo .................. H04B 7/0695 375/340 |
| 2018/0205585 A1* | 7/2018 | Sadiq ................ H04B 7/088 |
| 2018/0278309 A1 | 9/2018 | Raghavan et al. |
| 2019/0068265 A1 | 2/2019 | Lee et al. |
| 2019/0082331 A1 | 3/2019 | Raghavan et al. |
| 2019/0140722 A1 | 5/2019 | Raghavan et al. |
| 2019/0239233 A1* | 8/2019 | Ryu .................. H04W 72/046 |
| 2020/0295817 A1* | 9/2020 | Loghin ............... H04B 7/086 |
| 2022/0094408 A1 | 3/2022 | Park et al. |

FOREIGN PATENT DOCUMENTS

| | | |
|---|---|---|
| KR | 10-2013-0010120 | 1/2013 |
| KR | 10-2019-0022181 | 3/2019 |
| KR | 10-2020-0140030 | 12/2020 |

OTHER PUBLICATIONS

PCT/ISA/237 Written Opinion issued on PCT/KR2020/012522, dated Dec. 23, 2020, pp. 5.

\* cited by examiner

ELECTRONIC DEVICE FOR COMMUNICATING USING BEAMFORMING, AND OPERATING METHOD THEREFOR

CROSS-REFERENCE TO RELATED APPLICATION(S)

This application is a Bypass Continuation Application of PCT International Application No. PCT/KR2020/012522, which was filed on Sep. 17, 2020, and claims priority to Korean Patent Application No. 10-2019-0133541, which was filed on Oct. 25, 2019, the entire content of each of which is incorporated herein by reference.

BACKGROUND

1. Field

The disclosure relate generally to an electronic device which communicates using beamforming, and an operating method therefor.

2. Description of Related Art

With the development of communication techniques, there is ongoing research to provide a high-speed and reliable communication service in an electronic device. For example, there is an ongoing study of a method for providing an ultra-high frequency communication service using beamforming in the electronic device.

An electronic device supporting beamforming may communicate using a beam with highest channel quality among a plurality of beams. However, when communication is performed in the electronic device by continuously using one antenna module having the beam with the highest channel quality, overheating of the antenna module may occur. When a specific antenna module is overheated, the electronic device may disable the overheated antenna module, and may communicate by using a different antenna module satisfying specified channel quality. Until the overheating of the disabled antenna module is cancelled, the electronic device is not able to support communication in a direction corresponding to the disabled antenna module. The electronic device may re-perform a beam search to select a beam of the different antenna module satisfying the specified channel quality. In this case, it may be difficult to ensure continuous communication.

SUMMARY

The disclosure has been made to address at least the above-mentioned problems and/or disadvantages and to provide at least the advantages described below.

An aspect of the disclosure is to provide a method and electronic device for performing communication using, alternately or by turn, a plurality of antenna modules having a beam satisfying specified channel quality in the electronic device.

In accordance with an aspect of the disclosure, an electronic device is provided including a plurality of antenna modules which are disposed at different locations and are configured to support beamforming, a communication module configured to transmit and receive a signal through the plurality of antenna modules, at least one processor, and a memory coupled to the at least one processor. The memory may store instructions, when executed, cause the processor to perform a beam search on the plurality of antenna modules, select at least two antenna modules allowing a beam satisfying a specified condition to be formed among the plurality of antenna modules, based on a result of the beam search, and communicate by alternately using the selected at least two antenna modules.

In accordance with another aspect of the disclosure, a method of operating an electronic device is provided that includes performing a beam search on a plurality of antenna modules included in the electronic device, selecting at least two antenna modules among the plurality of antenna modules allowing a beam satisfying a specified condition to be formed among the plurality of antenna modules, based on a result of the beam search, and performing wireless communication by alternately using the selected at least two antenna modules.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Figure 1:
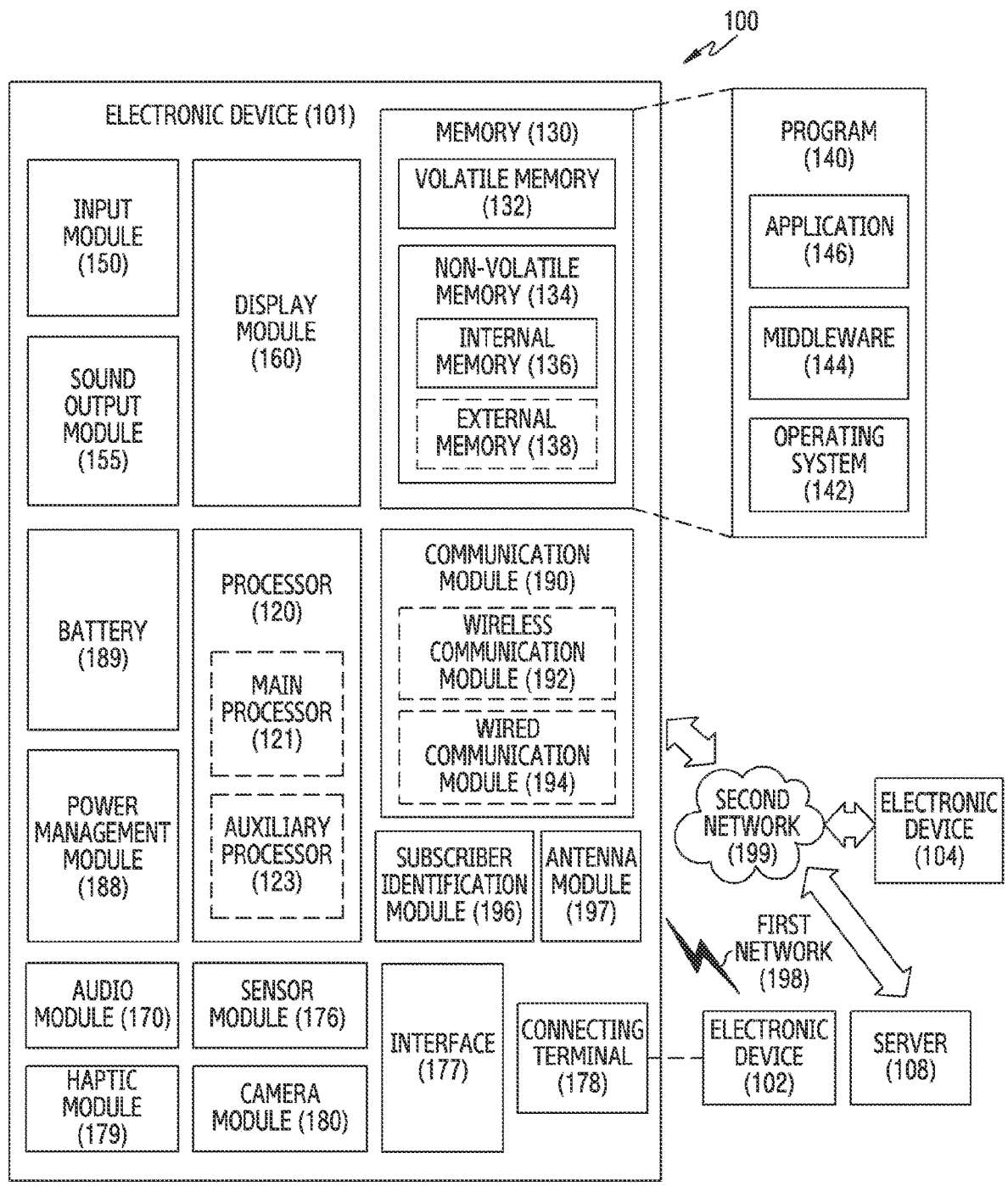
FIG. 1 illustrates an electronic device in a network environment, according to an embodiment.

Hereinafter, various embodiments of the disclosure are described with reference to the accompanying drawings. However, it should be appreciated that embodiments and terms used therein are not intended to limit the technological features set forth herein to particular embodiments and include various changes, equivalents, or replacements for an embodiment of the disclosure.

With regard to the description of the drawings, similar reference numerals may be used to refer to similar or related elements.

Additionally, a singular expression may include a plural expression unless there is a contextually distinctive difference.

FIG. 1 illustrates an electronic device in a network environment according to an embodiment.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of, the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or IR data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, cloud computing, distributed computing, or client-server computing technology may be used, for example.

Figure 2:
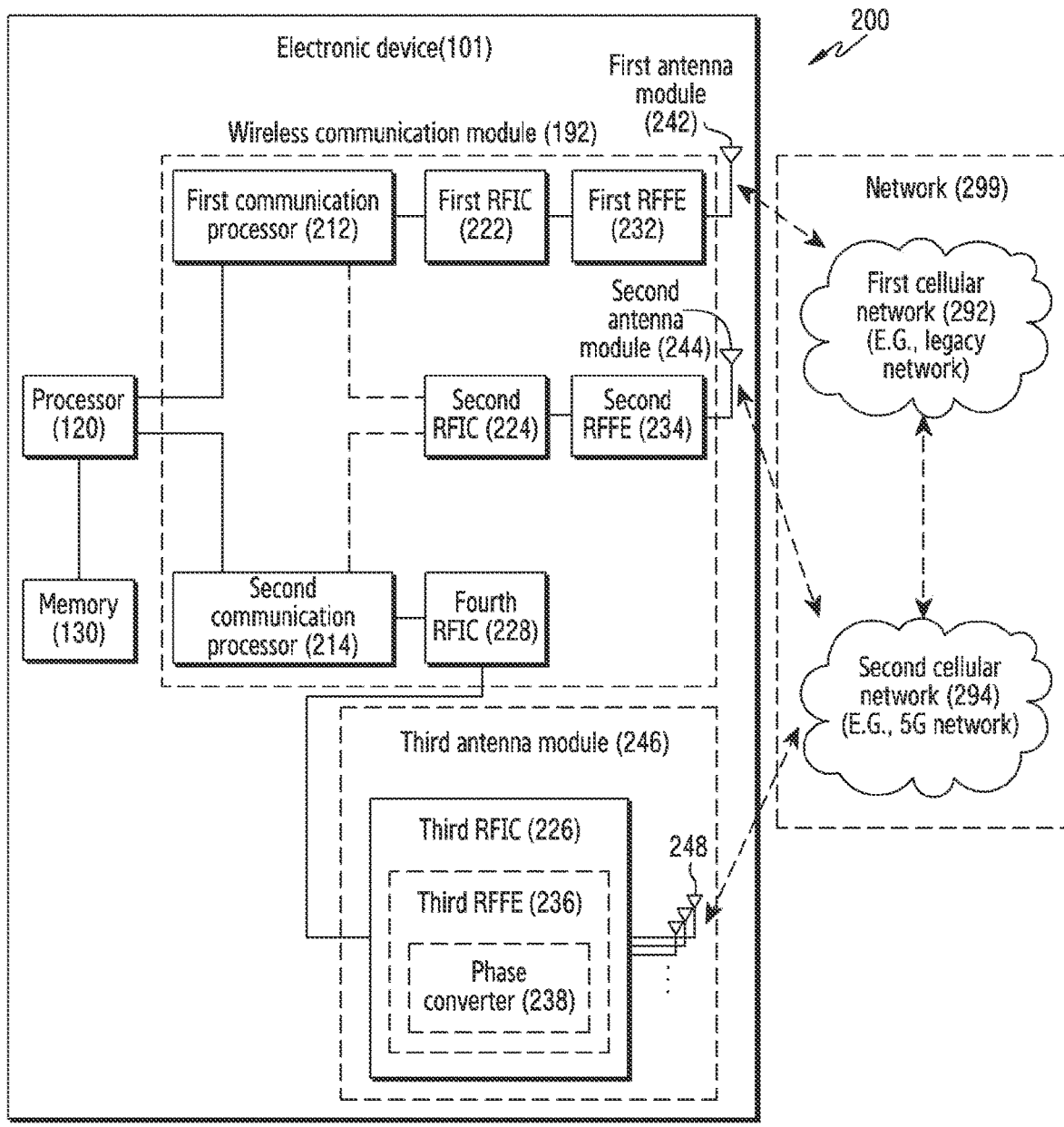
FIG. 2 illustrates an electronic device for supporting legacy network communication and $5^{th}$ Generation (5G) network communication, according to an embodiment.

FIG. 2 illustrates an electronic device for supporting legacy network communication and 5G network communication in a network environment including a plurality of cellular networks according to an embodiment.

Referring to FIG. 2, an electronic device 101 may include a first CP (e.g., including processing circuitry) 212, a second CP (e.g., including processing circuitry) 214, a first RFIC 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor (e.g., including processing circuitry) 120 and a memory 130. The second network 199 may include a first cellular network 292 and a second cellular network 294. The electronic device may further include at least one of the parts shown in FIG. 1 and the second network 199 may further include at least one another network. The first CP 212, the second CP 214, the first RFIC 222, the second RFIC 224, the fourth RFIC 228, the first RFFE 232, and the second RFFE 234 may form at least a portion of a wireless communication module 192. The fourth RFIC 228 may be omitted or may be included as a portion of the third RFIC 226.

The first CP 212 can support establishment of a communication channel with a band to be used for wireless communication with the first cellular network 292 and legacy network communication through the established communication channel. The first cellular network may be a legacy network including a $2^{nd}$ generation (2G), $3^{rd}$ generation (3G), $4^{th}$ generation (4G), or long-term evolution (LTE) network. The second CP 214 can support establishment of a communication channel corresponding to a designated band (e.g., about 6 GHz~about 60 GHz) of a band to be used for wireless communication with the second cellular network 294 and 5G network communication through the established communication channel. The second cellular network 294 may be a 5G network that is defined in 3GPP. Further, according to an embodiment, the first CP 212 or the second CP 214 can support establishment of a communication channel corresponding to another designated band (e.g., about 6 GHz or less) of a band to be used for wireless communication with the second cellular network 294 and 5G network communication through the established communication channel. The first CP 212 and the second CP 214 may be implemented in a single chip or a single package. The first CP 212 or the second CP 214 may be disposed in a single chip or a single package together with the processor 120, the auxiliary processor 123, or the communication module 190. The first CP 212 and the second CP 214 is directly or indirectly connected by an interface, thereby being able to provide or receive data or control signal in one direction or two directions.

The first RFIC 222, in transmission, can convert a baseband signal generated by the first CP 212 into a radio frequency (RF) signal of about 700 MHz to about 3 GHz that is used for the first cellular network 292 (e.g., a legacy network). In reception, an RF signal can be obtained from the first cellular network 292 (e.g., a legacy network) through an antenna (e.g., the first antenna module 242) and can be preprocessed through an RFFE (e.g., the first RFFE 232). The first RFIC 222 can covert the preprocessed RF signal into a baseband signal so that the preprocessed RF signal can be processed by the first CP 212.

The second RFIC 224 can convert a baseband signal generated by the first CP 212 or the second CP 214 into an RF signal in a Sub6 band (e.g., about 6 GHz or less) (hereafter, 5G Sub6 RF signal) that is used for the second cellular network 294 (e.g., a 5G network). In reception, a 5G Sub6 RF signal can be obtained from the second cellular network 294 (e.g., a 5G network) through an antenna (e.g., the second antenna module 244) and can be preprocessed through an RFFE (e.g., the second RFFE 234). The second RFIC 224 can convert the processed 5G Sub6 RF signal into a baseband signal so that the processed 5G Sub6 RF signal can be processed by a corresponding CP of the first CP 212 or the second CP 214.

The third RFIC 226 can convert a baseband signal generated by the second CP 214 into an RF signal in a 5G Above6 band (e.g., about 6 GHz~about 60 GHz) (hereafter, 5G Above6 RF signal) that is used for the second cellular network 294 (e.g., a 5G network). In reception, a 5G Above6 RF signal can be obtained from the second cellular network 294 (e.g., a 5G network) through an antenna (e.g., the antenna 248) and can be preprocessed through the third RFFE 236. The third RFIC 226 can covert the preprocessed 5G Above6 RF signal into a baseband signal so that the preprocessed 5G Above6 RF signal can be processed by the first CP 214. The third RFFE 236 may be provided as a portion of the third RFIC 226.

The electronic device 101 may include a fourth RFIC 228 separately from or as at least a portion of the third RFIC 226. In this case, the fourth RFIC 228 can convert a baseband signal generated by the second CP 214 into an RF signal in an intermediate frequency band (e.g., about 9 GHz~about 11 GHz) (hereafter, IF signal), and then transmit the IF signal to the third RFIC 226. The third RFIC 226 can convert the IF signal into a 5G Above6 RF signal. In reception, a 5G Above6 RF signal can be received from the second cellular network 294 (e.g., a 5G network) through an antenna (e.g., the antenna 248) and can be converted into an IF signal by the third RFIC 226. The fourth RFIC 228 can covert the IF signal into a baseband signal so that IF signal can be processed by the second CP 214.

The first RFIC 222 and the second RFIC 224 may be implemented as at least a portion of a single chip or a single package. The first RFFE 232 and the second RFFE 234 may be implemented as at least a portion of a single chip or a single package. At least one of the first antenna module 242 or the second antenna module 244 may be omitted, or may be combined with another antenna module and can process RF signals in a plurality of bands.

The third RFIC 226 and the antenna 248 may be disposed on a substrate, thereby being able to form a third antenna module 246. For example, the wireless communication module 192 or the processor 120 may be disposed on a first substrate (e.g., a main PCB). In this case, the third RFIC 226 may be disposed in a partial area (e.g., the bottom) and the antenna 248 may be disposed in another partial area (e.g., the top) of a second substrate (e.g., a sub PCB) that is different from the first substrate, thereby being able to form the third antenna module 246. By disposing the third RFIC 226 and the antenna 248 on the same substrate, it is possible to reduce the length of the transmission line therebetween.

Accordingly, it is possible to reduce a loss (e.g., attenuation) of a signal in a high-frequency band (e.g., about 6 GHz~ about 60 GHz), for example, which is used for 5G network communication, due to a transmission line. Accordingly, the electronic device 101 can improve the quality and the speed of communication with the second cellular network 294 (e.g., 5G network).

The antenna 248 may be an antenna array including a plurality of antenna elements that can be used for beamforming. In this case, the third RFIC 226, for example, as a portion of the third RFFE 236, may include a plurality of phase shifters 238 corresponding to the antenna elements. In transmission, the phase shifters 238 can convert the phase of a 5G Above6 RF signal to be externally transmitted from the electronic device 101 (e.g., to a base station of a 5G network) through the respectively corresponding antenna elements. In reception, the phase shifters 238 can convert the phase of a 5G Above6 RF signal received from the outside through the respectively corresponding antenna element into the same or substantially the same phase. This allows for transmission or reception through beamforming between the electronic device 101 and the outside.

The second cellular network 294 (e.g., a 5G network) may be operated independently from (e.g., stand-alone (SA)) or connected and operated with (e.g., non-stand-alone (NSA)) the first cellular network 292 (e.g., a legacy network). For example, there may be only an access network (e.g., a 5G radio access network (RAN) or a next generation (NG) RAN) and there is no core network (e.g., a next generation core (NGC)) in a 5G network. In this case, the electronic device 101 can access the access network of the 5G network and then can access an external network (e.g., the internet) under control by the core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 230 and accessed by another part (e.g., the processor 120, the first CP 212, or the second CP 214).

Figure 3A:
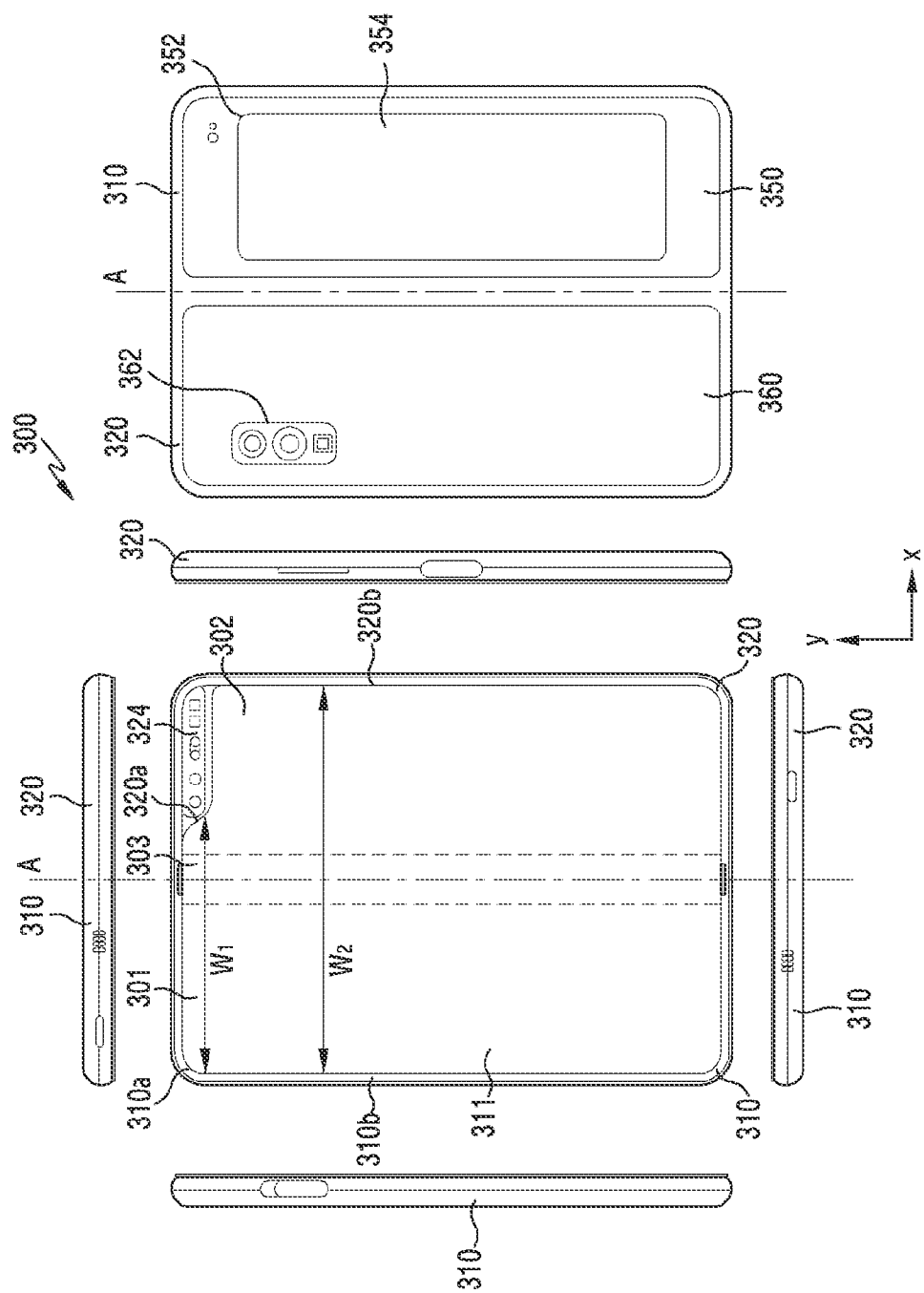
FIG. 3A illustrates a flat state of an electronic device, according to an embodiment.
Figure 3B:
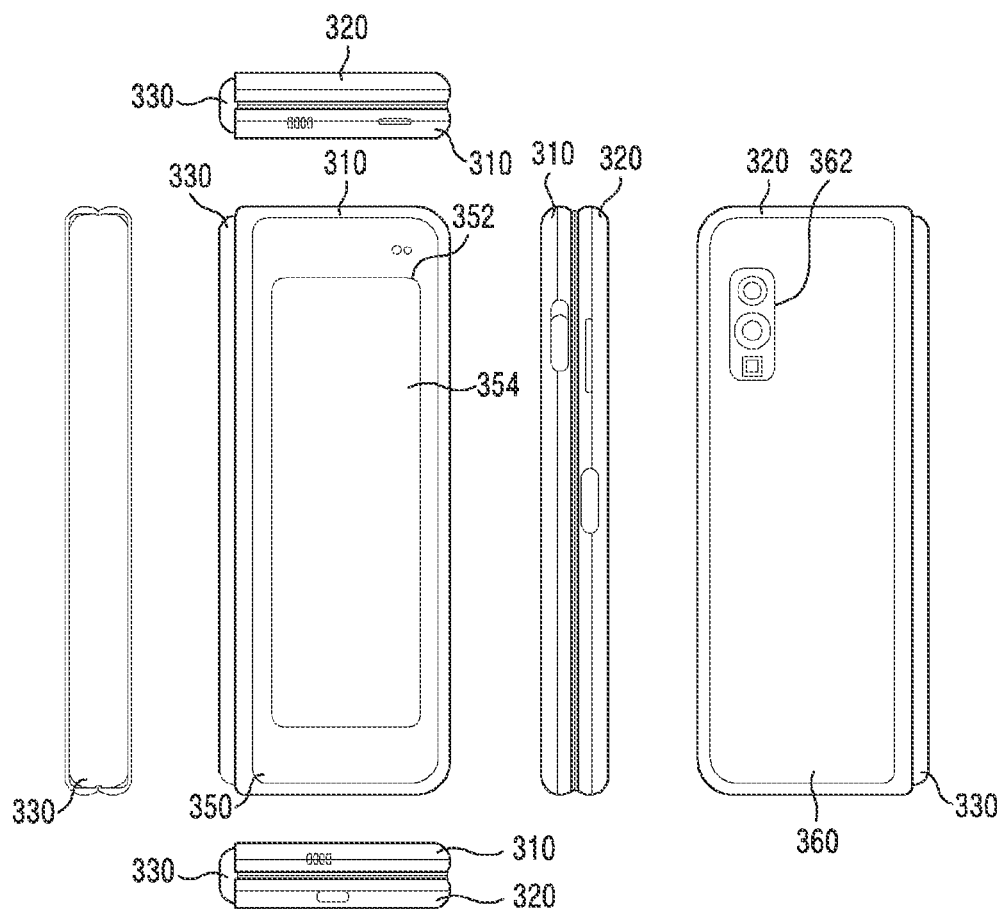
FIG. 3B illustrates a folded state of an electronic device, according to an embodiment.

FIG. 3A illustrates a flat state of an electronic device 101, according to an embodiment. FIG. 3B illustrates a folded state of the electronic device 101, according to an embodiment.

Referring to FIG. 3A and FIG. 3B, the electronic device 101 may include a foldable housing 300, a hinge cover 330 which covers a foldable portion of the foldable housing 300, and a flexible or foldable display (hereinafter, a display) 311 disposed inside a space formed by the foldable housing 300. For reference herein, a face on which the display 311 is disposed is a first face or front face of the electronic device 101. In addition, a face opposed to the front face is a second face or rear face of the electronic device 101. Further, a face surrounding a space between the front face and the rear face is a third face or side face of the electronic device 101.

The foldable housing 300 may include a first housing structure 310, a second housing structure 320 including a sensor region 324, a first rear cover 350, and a second rear cover 360. The foldable housing 300 of the electronic device 101 is not limited to the shape and coupling illustrated in FIG. 3A and FIG. 3B, and may be implemented in another shape or in another combination and/or coupling of components. For example, the first housing structure 310 and the first rear cover 350 may be formed integrally, and the second housing structure 320 and the second rear cover 360 may be formed integrally.

In the illustrated embodiment, the first housing structure 310 and the second housing structure 320 may be disposed at both sides about a folding axis (e.g., an axis A), and may have a shape generally symmetric about the folding axis (e.g., the axis A). As described below, an angle or distance between the first housing structure 310 and the second housing structure 320 may vary depending on whether a state of the electronic device 101 is the flat state, the folded state, or an intermediate state. In the illustrated embodiment, unlike the first housing structure 310, the second housing structure 320 additionally includes the sensor region 324 having various sensors disposed therein, but may have a mutually symmetric shape in the other regions.

As illustrated in FIG. 3A, the first housing structure 310 and the second housing structure 320 may form a recess together to accommodate the display 311. In the illustrated embodiment, due to the sensor region 324, the recesses may have two or more different widths in a direction perpendicular to the folding axis (e.g., the axis A).

For example, the recess may include: (1) a first width w1 between a first portion 310a in the first housing structure 310, parallel to the folding axis (e.g., the axis A), and a first portion 320a formed at an edge of the sensor region 324 in the second housing structure 320; and (2) a second width w2, formed by a second portion 310b of the first housing structure 310 and a second portion 320b not corresponding to the sensor region 324 in the second housing structure 320 and parallel to the folding axis (e.g., the axis A). In this case, the second width w2 may be longer than the first width w1. In other words, the first portion 310a of the first housing structure 310 and the first portion 320a of the second housing structure 320, which have a mutually asymmetric shape, may form the first width w1 of the recess, and the second portion 310b of the first housing structure 310 and the second portion 320b of the second housing structure 320, which have a mutually symmetric shape, may form the second width w2. In an embodiment, the first portion 320a and second portion 320b of the second housing structure 320 may have different distances from the folding axis (e.g., the axis A). The width of the recess is not limited to the illustrated example. The recess may have a plurality of widths due to a portion having a shape of the sensor region 324 or an asymmetrical shape of the first housing structure 310 and second housing structure 320.

At least part of the first housing structure 310 and second housing structure 320 may be formed of a metal material or non-metal material having a selected rigidity level to support the display 311.

The sensor region 324 may be formed adjacent to one corner of the second housing structure 320 to have a specific region. However, the arrangement, shape, and size of the sensor region 324 are not limited to the illustrated example. For example, the sensor region 324 may be provided at another corner of the second housing structure 320 or at any region between an upper-end corner and a lower-end corner. Components included in the electronic device 101 to perform various functions may be exposed to the front face of the electronic device 101 through the sensor region 324 or one or more openings prepared in the sensor region 324. In various embodiments, the aforementioned components may include various types of sensors. The sensor may include at least one of a front camera, a receiver, and a proximity sensor.

The first rear cover 350 may be disposed to one side of the folding axis (e.g., the axis A) in the rear face of the electronic device 101, and, for example, may have a substantially rectangular periphery. The periphery may be enclosed by the first housing structure 310. Similarly, the second rear cover 360 may be disposed to the other side of the folding axis (e.g., the axis A) of the rear face of the electronic device 101, and a periphery thereof may be enclosed by the second housing structure 320.

In the illustrated embodiment, the first rear cover 350 and the second rear cover 360 may have a substantially symmetric shape about the folding axis (the axis A). However, the first rear cover 350 and the second rear cover 360 do not necessarily have a mutually symmetric shape. For example, the first rear cover 350 and second rear cover 360 included in the electronic device 101 may have various shapes. The first rear cover 350 and the first housing structure 310 may be formed integrally, and the second rear cover 360 and the second housing structure 320 may be formed integrally.

The first rear cover 350, the second rear cover 360, the first housing structure 310, and the second housing structure 320 may form a space in which various components (e.g., a PCB or a battery) of the electronic device 101 may be disposed. One or more components may be disposed or visually exposed on the rear face of the electronic device 101. For example, at least part of a sub-display 354 may be visually exposed through a first rear region 352 of the first rear cover 350. Alternatively, one or more components or sensors may be disposed or visually exposed through a second rear region 362 of the second rear cover 360. The sensor may include a proximity sensor and/or a rear camera.

Referring to FIG. 3B, the hinge cover 330 may be disposed between the first housing structure 310 and the second housing structure 320 to hide an internal component (e.g., the hinge structure). The hinge cover 330 may be hidden by part of the first housing structure 310 and second housing structure 320 or may be exposed to the outside according to a state (the flat state or the folded state) of the electronic device 101.

For example, when the electronic device 101 is in the flat state as illustrated in FIG. 3A, the hinge cover 330 may not be exposed since it is hidden by the first housing structure 310 and the second housing structure 320. When the electronic device 101 is in the folded state (e.g., a fully folded state) as illustrated in FIG. 3B, the hinge cover 330 may be exposed to the outside between the first housing structure 310 and the second housing structure 320. In case of the intermediate state in which the first housing structure 310 and the second housing structure 320 are folded with a certain angle, the hinge cover 330 may be partially exposed to the outside between the first housing structure 310 and the second housing structure 320. However, in this case, a region to be exposed may be smaller than that in the fully folded state. In an embodiment, the hinge cover 330 may include a curved face.

The display 311 may be disposed in a space formed by the foldable housing 300. For example, the display 311 may be mounted on a recess formed by the foldable housing 300, and may form most of the front face of the electronic device 101.

The front face of the electronic device 101 may include the display 311, some regions of the first housing structure 310 adjacent to the display 311, and some regions of the second housing structure 320. In addition, the rear face of the electronic device 101 may include the first rear cover 350, some regions of the first housing structure 310 adjacent to the first rear cover 350, and some regions of the second housing structure 320 adjacent to the second rear cover 360.

The display 311 may imply a display in which at least some regions may be transformed to a flat face or a curved face. In an embodiment, the display 311 may include a folding region 303, a first region 301 disposed to one side (e.g., a left side of the folding region 303 of FIG. 3A) with respect to the folding region 303, and a second region 302 disposed to the other side (e.g., a right side of the folding region 303 of FIG. 3A).

A region of the display 311 of FIG. 3A is divided for exemplary purposes, and the display 311 may be divided into a plurality of (e.g., at least 4 or 2) regions according to a structure or a function. For example, although the region of the display 311 may be divided by the folding axis (e.g., the axis A) or the folding region 303 extending parallel to a y-axis in the embodiment of FIG. 3A, in another embodiment, the region of the display 311 may be divided according to another folding region (e.g., a folding region parallel to an x-axis) or another folding axis (e.g., a folding axis parallel to the x-axis).

The first region 301 and the second region 302 may have a shape generally symmetric about the folding region 303. However, unlike the first region 301, the second region 302 may include a cut notch according to whether the sensor region 324 exists, but in the other regions, may have a shape symmetric to the first region 301. In other words, the first region 301 and the second region 302 may include portions having shapes symmetric to each other and portions having shapes asymmetric to each other.

Hereinafter, an operation of the first housing structure 310 and second housing structure 320 according to the state (e.g., the flat state and the folded state) of the electronic device 101 and each region of the display 311 will be described.

When the electronic device 101 is in the flat state (e.g., FIG. 3A), the first housing structure 310 and the second housing structure 320 may be disposed to form an angle of 180 degrees and to face substantially the same direction. A surface of the first region 301 of the display 311 and a surface of the second region 302 may form about 180 degrees to each other, and may face substantially the same direction (e.g., a front direction of the electronic device). For example, the folding region 303 may be coplanar with the first region 301 and the second region 302.

When the electronic device 101 is in the folded state (e.g., FIG. 3B), the first housing structure 310 and the second housing structure 320 may be disposed to face each other. A surface of the first region 301 of the display 311 and a surface of the second region 302 may form a narrow angle (e.g., between 0 to 10 degrees) and may face each other. At least part of the folding region 303 may be formed of a curved face having a specific curvature.

When the electronic device 101 is in the intermediate state, the first housing structure 310 and the second housing structure 320 may be disposed to have a certain angle with each other. A surface of the first region 301 of the display 311 and a surface of the second region 302 may have an angle greater than that in the folded state (e.g., FIG. 3B) and less than that in the flat state (e.g., FIG. 3A). At least part of the folding region 303 may be formed of a curved face having a certain curvature. In this case, the curvature may be less than that in the folded state.

Figure 3C:
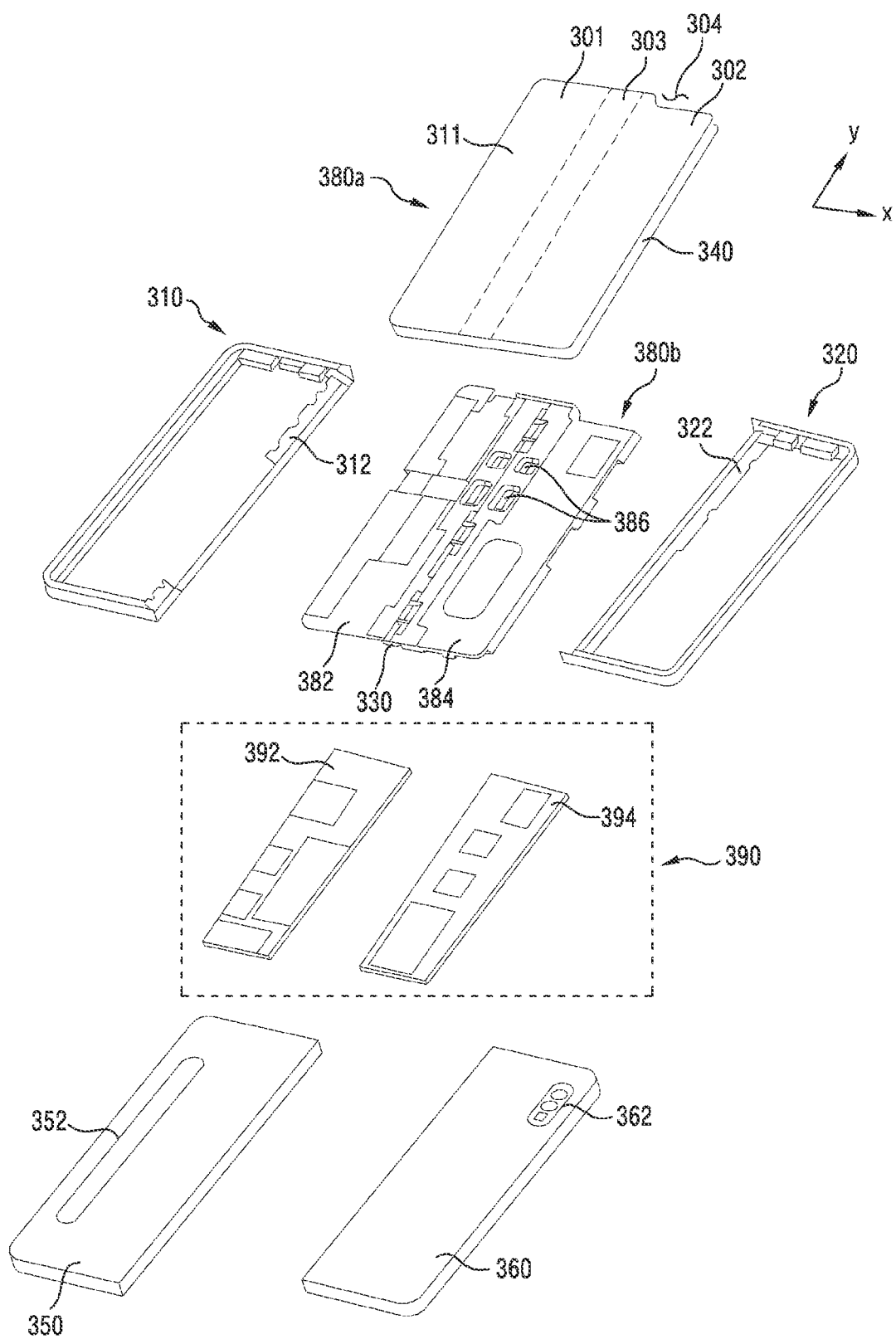
FIG. 3C is an exploded perspective view of an electronic device, according to an embodiment.

FIG. 3C is an exploded perspective view of an electronic device, according to an embodiment.

Referring to FIG. 3C, the electronic device 101 includes a display unit 380*a*, a bracket assembly 380*b*, a substrate 390, the first housing 310, the second housing 320, the first rear cover 350, and the second rear cover 360. The display unit 380*a* may also be referred to as a display module or a display assembly.

The display unit 380*a* may include the display 311 and one or more plates 340 to which the display 311 is mounted.

In an embodiment, the plate 340 may be disposed between the display 311 and the bracket assembly 380b. The display 311 may be disposed on at least part of one face (e.g., an upper face of FIG. 3C) of the plate 340. The plate 340 may be formed in a shape corresponding to the display 311. For example, some regions of the plate 340 may be formed in a shape corresponding to a notch 304 of the display 311.

The bracket assembly 380b may include a first bracket 382, a second bracket 384, a hinge structure disposed between the first bracket 382 and the second bracket 384, the hinge cover 330 which covers the hinge structure when viewed from the outside, and a wiring member 386 (e.g., a flexible PCB (FPCB)) which traverses the first bracket 382 and the second bracket 384.

The bracket assembly 380b may be disposed between the display 311 and the substrate 390. For example, the first bracket 382 may be disposed between a first substrate 392 and the first region 301 of the display 311. The second bracket 384 may be disposed between a second substrate 394 and the second region 302 of the display 311.

The wiring member 386 and the hinge structure may be partially disposed inside the bracket assembly 380b. The wiring member 386 may be disposed in a direction (e.g., x-axis direction) which traverses the first bracket 382 and the second bracket 384. The wiring member 386 may be disposed in a direction (e.g., x-axis direction) perpendicular to a folding axis (e.g., y-axis or the folding axis (axis A) of FIG. 3A) of the folding region 303 of the electronic device 101.

The substrate 390 may include the first substrate 392 disposed to the first bracket 382 and the second substrate 394 disposed to the second bracket 384. The first substrate 392 and the second substrate 394 may be disposed inside a space formed by the bracket assembly 380b, the first housing 310, the second housing 320, the first rear cover 350, and the second rear cover 360. Components for implementing various functions of the electronic device 101 may be mounted on the first substrate 392 and the second substrate 394.

The first housing 310 and the second housing 320 may be assembled to be coupled at both sides of the bracket assembly 380b in a state where the display unit 380a is coupled to the bracket assembly 380b. The first housing 310 and the second housing 320 may be coupled to the bracket assembly 380b by being slid at both sides of the bracket assembly 380b.

The first housing 310 may include a first rotation support face 312, and the second housing 320 may include a second rotation support face 322 corresponding to the first rotation support face 312. The first rotation support face 312 and the second rotation support face 322 may include a curved face corresponding to a curved face included in the hinge cover 330.

When the electronic device 101 is in the flat state (e.g., the electronic device of FIG. 3A), the first rotation support face 312 and the second rotation support face 322 cover the hinge cover 330, and thus the hinge cover 330 is not exposed to the rear face of the electronic device 101 or may be exposed to the minimum extent possible. When the electronic device 101 is in the folded state (e.g., the electronic device of FIG. 3B), the first rotation support face 312 and the second rotation support face 322 are rotated along a curved face included in the hinge cover 330, and thus the hinge cover 330 is exposed to the rear face of the electronic device 101 to the maximum extent possible.

Although the structure of the foldable electronic device has been described above with reference to FIG. 3A to FIG. 3C, various embodiments of the disclosure may not be limited thereto. For example, various embodiments of the disclosure may be applied to various types of electronic devices. For example, various embodiments of the disclosure may be applied to an electronic device capable of being not only folded but also curved and/or bent. As another example, various embodiments of the disclosure may also be applied to an electronic device not capable of being folded, curved, and/or bent.

Figure 4A:
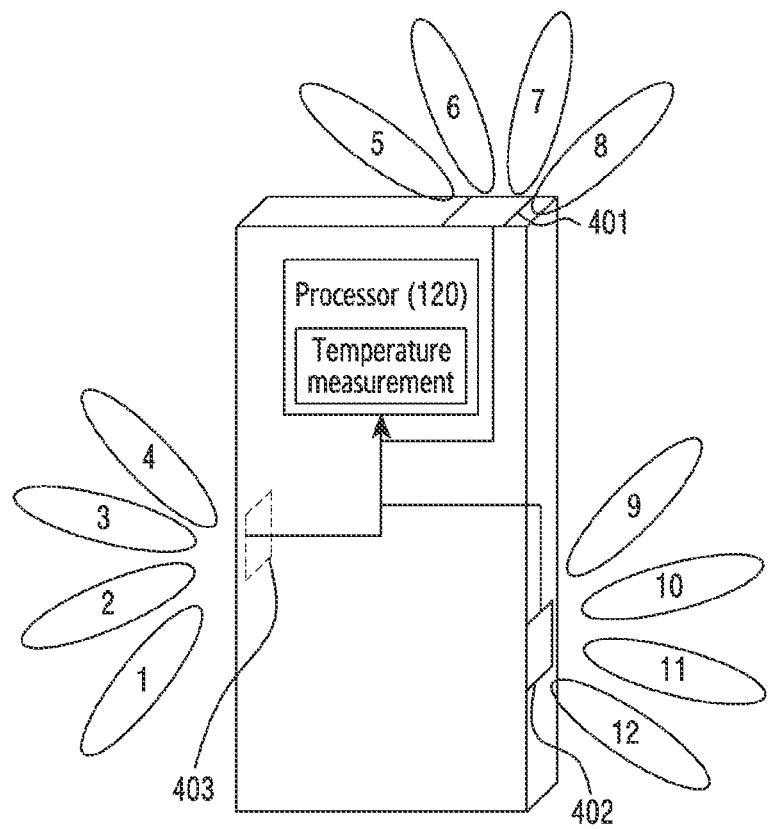
FIG. 4A illustrates a plurality of antenna modules supporting beamforming in an electronic device, according to an embodiment.
Figure 4B:
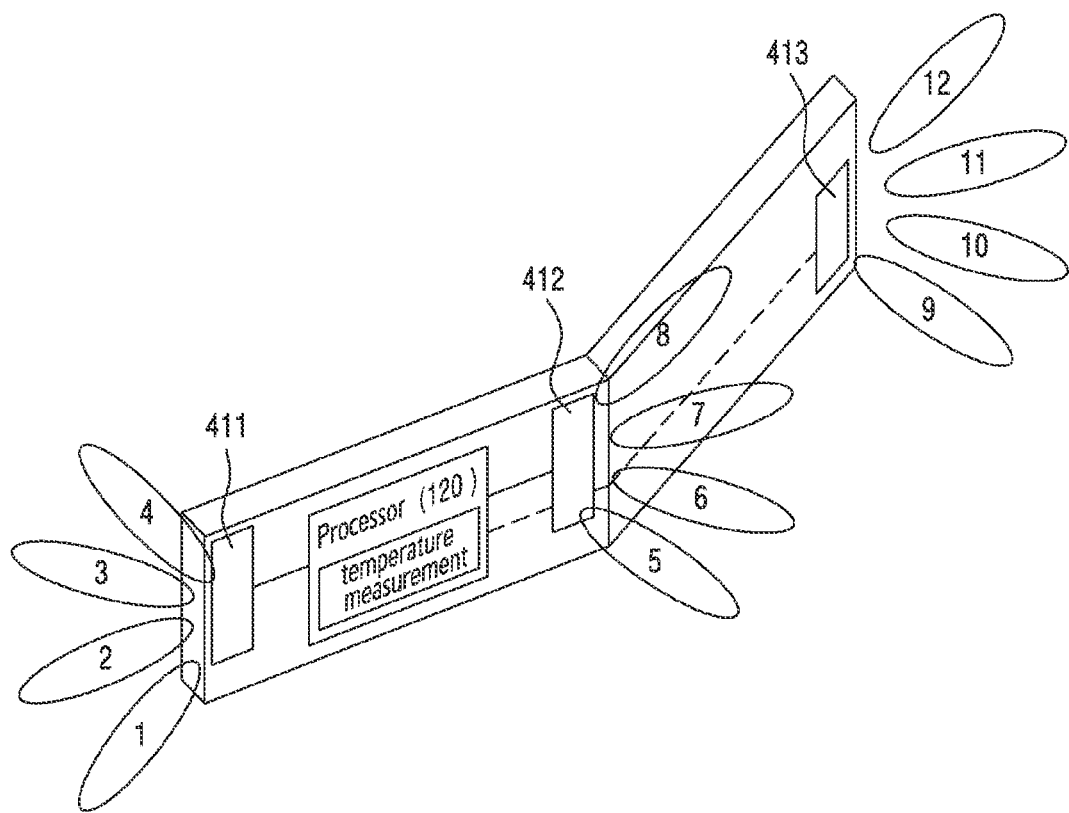
FIG. 4B illustrates a plurality of antenna modules supporting beamforming in a foldable electronic device, according to an embodiment.

FIG. 4A illustrates a plurality of antenna modules supporting beamforming in an electronic device, according to an embodiment, and FIG. 4B illustrates a plurality of antenna modules supporting beamforming in a foldable electronic device, according to an embodiment. Some configurations of FIG. 4A and FIG. 4B will be described with reference to FIG. 5.

Figure 5:
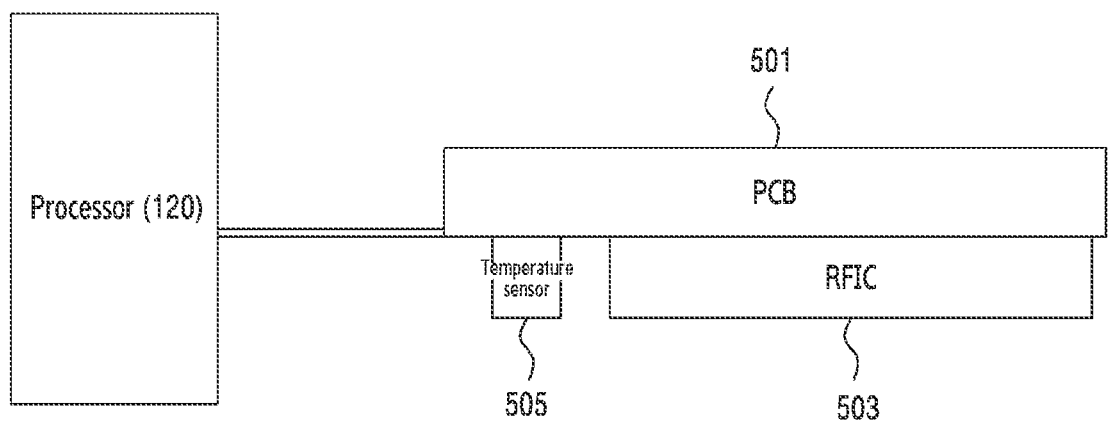
FIG. 5 illustrates a temperature sensor for measuring temperature of an antenna module in an electronic device according to an embodiment.

FIG. 5 illustrates a temperature sensor for measuring temperature of an antenna module in an electronic device according to an embodiment.

Referring to FIG. 4A and FIG. 4B, the electronic device 101 includes a plurality of antenna modules 401, 402, 403, 411, 412, and 413 (e.g., the antenna module 246 of FIG. 2). The plurality of antenna modules 401, 402, 403, 411, 412, and 413 may form a plurality of respective beams facing different directions, and may communicate with at least one different electronic device (e.g., the electronic device 102, server 108, or base station of FIG. 1) through the formed beams. Each of the plurality of antenna modules 401, 402, 403, 411, 412, and 413 may form and/or control a beam direction, based on a specified beam table. For example, one antenna module may include a plurality of beams facing different directions, based on a value of a corresponding antenna module included in the beam table (e.g., a register value of each of a plurality of phase shifters). For example, each antenna module may form 4 beams each having different identification information. When the electronic device 101 includes 3 antenna modules, the electronic device 101 may form 12 beams in total.

Depending on a change in a mechanical state (or a folding angle, e.g., a change from FIG. 4A to FIG. 4B) of the electronic device, at least one beam (e.g., a beam 8 of FIG. 4B) out of a plurality of beams 5, 6, 7, and 8 included in a first antenna module (e.g., the antenna modules 401 and 402) and at least one beam (e.g., a beam 12 of FIG. 4B) out of a plurality of beams 9, 10, 11, and 12 included in another antenna module (e.g., antenna modules 402 and 413) may be formed to face the same direction.

The electronic device may perform a beam search (or beam training) by using a plurality of beams formable respectively by the plurality of antenna modules 401, 402, 403, 411, 412, and 413. For example, the electronic device may form 12 beams by using the 3 antenna modules 401, 402, and 403 (or 411, 412, and 413) included in the electronic device, and may receive a signal from a base station by sequentially using the 12 beams and measure channel quality for each of the 12 beams by using the signal.

A processor (e.g., the processor 120 of FIG. 1 and FIG. 2) of the electronic device may collect and measure temperature information of each of the plurality of antenna modules, by using a plurality of temperature sensors disposed adjacent to the plurality of respective antenna modules. The processor 120 may collect the temperature information of the plurality of antenna modules every specified period or whenever a specified event occurs. Each temperature sensor disposed to a substrate (e.g., a PCB) having at least one antenna module disposed thereon may measure temperature of at least one antenna module and transfer the measured temperature information to the processor 120. For example, as illustrated in FIG. 5, a temperature sensor 505 may be disposed to a PCB 501 having an RFIC 503 disposed thereon, and may be coupled to a substrate (e.g., a main PCB) on which the processor 120 of the electronic device is disposed, through a connector coupled to the PCB 501.

In FIG. 4A and FIG. 4B described above, the number of the plurality of antenna modules included in the electronic device 101 and/or positions at which the plurality of antenna modules are disposed are, for exemplary purposes, only for facilitating understanding, and various embodiments of the disclosure are not limited thereto. For example, the electronic device 101 may include 4 or more antenna modules, and positions at which the antenna modules are disposed may vary depending on a business operator and/or a designer.

The processor 120 of FIG. 1 and/or FIG. 2 may perform a beam search by using a plurality of antenna modules (e.g., the third antenna module 246 of FIG. 2) included in the electronic device 101. For example, the processor 120 may set a register value of a phase shifter, based on a specified beam table, and thus may form a plurality of beams by using the plurality of antenna modules. A plurality of beams formed by one antenna module may face different directions, and beams included in different antenna modules may face different directions or may face the same direction. The beam search may imply a series of processes in which a signal transmitted from a base station is received by using a plurality of beams formed under the control of the processor 120 to measure channel quality for each of the plurality of beams. The channel quality may include, for example, at least one of a reference signal received power (RSRP), a received signal strength indicator (RSSI), a signal to noise ratio (SNR), and a signal to interference noise ratio (SINR).

The processor 120 may select one or more antenna modules for performing a beam search from among a plurality of antenna modules, based on at least one of a folding angle (or a mechanical state) of the electronic device and a position gripped by a user (e.g., a shape in which the user grips the electronic device). The processor 120 may form a plurality of beams by using one or more antenna modules selected from among the plurality of antenna modules, and may perform the beam search on the formed plurality of beams.

The processor 120 may select at least two antenna modules having a beam satisfying a specified condition. The processor 120 may select one beam with highest channel quality while satisfying specified channel quality from among a plurality of beams of which channel quality is measured, and may select an antenna module having the selected beam as a first antenna module for performing communication. The processor 120 may identify channel quality of beams of the remaining antenna module other than the first antenna module among the plurality of modules, and may additionally select one beam with highest channel quality while satisfying specified channel quality from among beams of the remaining antenna modules. The processor 120 may select an antenna module having the additionally selected beam as a second antenna module for performing communication. The processor 120 may determine whether a beam satisfying specified channel quality is present among beams of the remaining antenna module other than the first antenna module and second antenna module among the plurality of modules. In the presence of the beam satisfying the specified channel quality, the processor 120 may select an antenna module having the beam as a third antenna module for performing communication.

The processor 120 may communicate by alternately using the selected at least two antenna modules. For example, the processor 120 may provide control to repeatedly perform a scheme in which a first beam of a first antenna module is used for communication during a specified time and a second beam of a second antenna module is used for communication during a specified time. The first beam may be a beam measured to have highest channel quality while satisfying specified channel quality among a plurality of beams formable in the first antenna module. The second beam may be a beam measured to have highest channel quality while satisfying specified channel quality among a plurality of beams formable in the second antenna module.

The processor 120 may measure temperature of each of the selected at least two antenna modules, and may select at least one antenna module to be used in communication, based on the measured temperature. For example, the processor 120 may periodically measure temperature of each of the selected two antenna modules, and may determine whether temperature of at least one antenna module out of the selected two antenna modules exceeds specified temperature. When the temperature of the at least one antenna module out of the selected at least two antenna modules exceeds the specified temperature, the processor 120 may provide control such that communication is performed by using the remaining one or more antenna modules other than the antenna module exceeding the specified temperature. For example, the processor 120 may exclude the antenna module exceeding the specified temperature from the module for performing communication. The processor 120 may communicate by using one antenna module, based on the measured temperature, or may communicate by alternately using the at least two antenna modules.

According to an embodiment, the electronic device 101 may include a plurality of antenna modules which are disposed at different locations and which support beamforming, a communication module which transmits and receives a signal through the plurality of antenna modules, at least one processor, and a memory coupled to the at least one processor. The memory may store instructions, when executed, causing the processor to perform a beam search on the plurality of antenna modules, select at least two antenna modules allowing a beam satisfying a specified condition to be formed among the plurality of antenna modules, based on a result of the beam search, and communicate by alternately using the selected at least two antenna modules.

The instructions may cause the processor to select a first antenna module which allows a first beam satisfying a first specified condition to be formed among a plurality of beams formable by the plurality of antenna modules, and select a second antenna module which allows a second beam satisfying a second specified condition to be formed among a plurality of beams formable by at least one antenna module other than the first antenna module among the plurality of antenna modules. At least one of the first specified condition and the second specified condition may include a condition for channel quality.

The electronic device may further include a temperature sensor which measures temperature for the plurality of antenna modules. The instructions may cause the processor to disable an antenna module, of which temperature measured by the temperature sensor exceeds a first threshold, out of the selected two antenna modules so that the antenna module is not used in communication, and enable the disabled antenna module so that the disabled antenna module is used in communication when the temperature measured by the temperature sensor is decreased to be less than a second threshold.

The electronic device may further include at least one sensor which detects a mechanical state of the electronic device or a shape in which a user grips the electronic device. The instructions may cause the processor to select one or more antenna modules for performing the beam search from among the plurality of antenna modules by considering at least one of the mechanical state of the electronic device and the shape in which the user grips the electronic device, detected by the sensor.

The instructions may cause the processor to select one or more antenna modules for performing the beam search by considering directions of the plurality of beams formable by the plurality of antenna modules.

The instructions may cause the processor to select one antenna module out of the at least two antenna modules capable of forming beams of the same direction to perform the beam search, when the at least two antenna modules among the plurality of antenna modules are capable of forming beams of the same direction at a folding angle of the electronic device.

The instructions may cause the processor to select an additional antenna module for the communication from among one or more antenna modules not selected from among the plurality of antenna modules. Herein, the additional antenna module may form a beam in the same direction as a direction of a beam formed for communication by the selected at least two antenna modules among the one or more antenna modules not selected.

Figure 6:
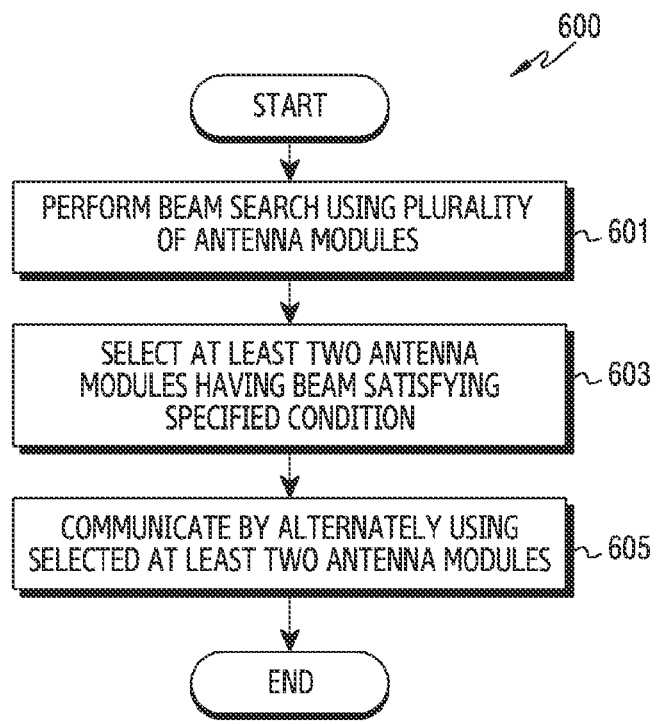
FIG. 6 is a flowchart in which an electronic device communicates by using at least two antenna modules, according to an embodiment.
Figure 7A:
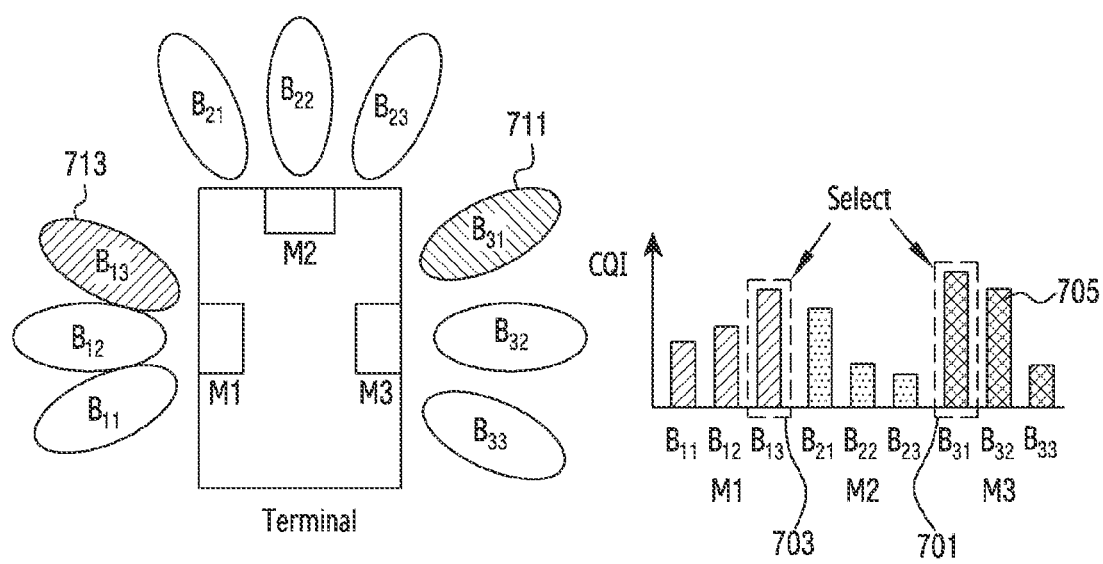
FIG. 7A illustrates an electronic device selecting at least two antenna modules, according to an embodiment.
Figure 7B:
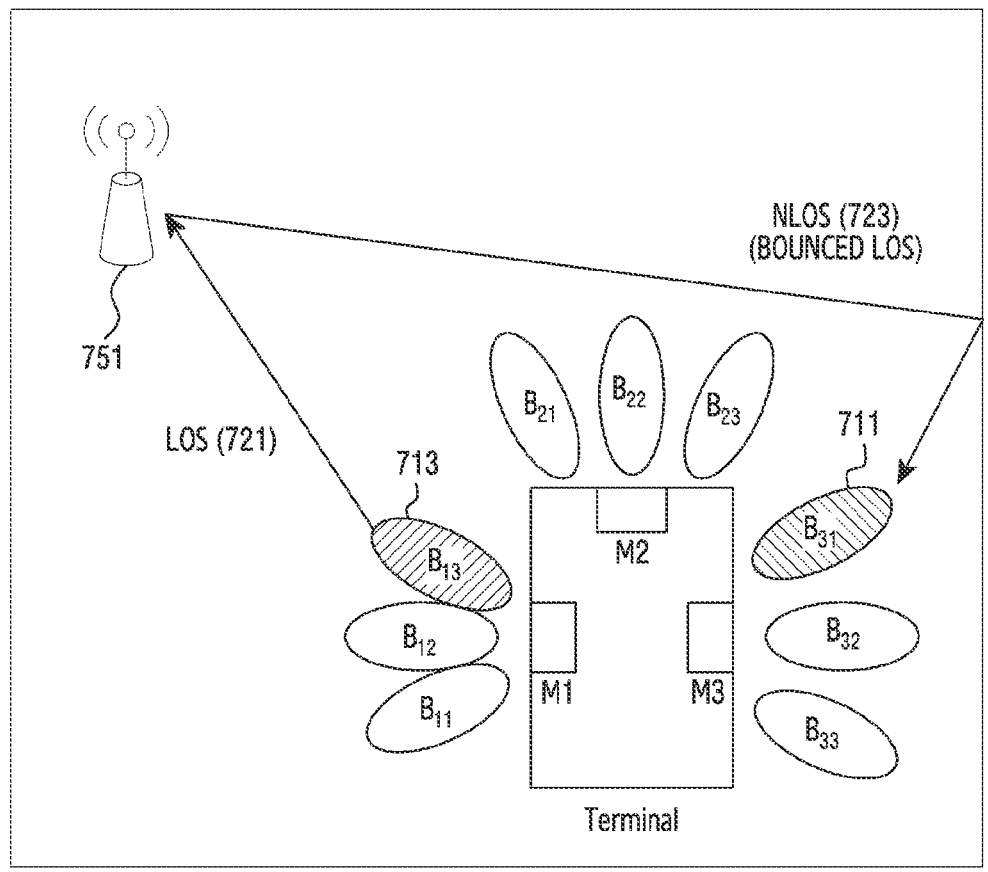
FIG. 7B illustrates a communication environment of an electronic device and a base station, according to an embodiment.

FIG. 6 is a flowchart 600 in which an electronic device communicates by using at least two antenna modules, according to an embodiment. The electronic device of FIG. 6 may be the electronic device 101 of FIG. 1. At least some operations of FIG. 6 will be described below with reference to FIG. 7A and FIG. 7B. FIG. 7A is an exemplary diagram in which an electronic device selects at least two antenna modules, according to various embodiments, and FIG. 7B is an exemplary diagram for a communication environment of the electronic device and a base station, according to an embodiment.

Referring to FIG. 6, in step 601, the electronic device (e.g., the processor 120 of FIG. 1) may perform a beam search using a plurality of antenna modules. According to an embodiment, the processor 120 may perform the beam search by using a plurality of antenna modules (e.g., the third antenna module 246 of FIG. 2) included in the electronic device 101. For example, the processor 120 may identify register values of phase shifters respectively corresponding to the plurality of antenna modules, based on a specified beam table, and may set and/or change a phase of the phase shifters, based on the identified value, thereby forming a plurality of beams. The plurality of beams respectively included in the plurality of antenna modules may be formed to face the same direction or different directions. For example, as illustrated in FIG. 7A, a plurality of beams $B_{11}$, $B_{12}$, and $B_{13}$ included in an antenna module M1, a plurality of beams $B_{21}$, $B_{22}$, and $B_{23}$ included in an antenna module M2, and a plurality of beams $B_{31}$, $B_{32}$, and $B_{33}$ included in an antenna module M3 may be formed to face different directions.

The processor 120 may use a plurality of beams to receive a signal transmitted from a base station, and may perform a beam search for measuring channel quality for each of the plurality of beams, based on a result of receiving the signal by using the plurality of beams. The processor 120 may perform the beam search on all antenna modules included in the electronic device 101, or may select one or more antenna modules corresponding to at least some of the antenna modules and perform the beam search on the selected one or more antenna modules. For example, the processor 120 may select one or more antenna modules from among the plurality of antenna modules included in the electronic device 101, based on at least one of a mechanical state (or a folding angle) of the electronic device 101 and a position gripped by a user.

In step 603, the electronic device (e.g., the processor 120) may select at least two antenna modules having a beam satisfying a specified condition. The processor 120 may select at least two antenna modules with a beam satisfying a specified condition, based on a beam search result. For example, the processor 120 may select one beam with highest channel quality while satisfying specified channel quality from among a plurality of beams, and may select an antenna module having the selected beam, as a first antenna module for performing communication. The processor 120 may select an antenna module having a beam with highest channel quality while satisfying specified channel quality from among the remaining antenna modules other than the first antenna module, as a second antenna module for performing communication.

As illustrated in FIG. 7A, the processor 120 may obtain, for example, a channel quality indictor (CQI) from each of the beams $B_{11}$, $B_{12}$, and $B_{13}$ of the antenna module M1, the beams $B_{21}$, $B_{22}$, and $B_{23}$ of the antenna module M2, and the beams $B_{31}$, $B_{32}$, and $B_{33}$ of the antenna module M3 through the beam search. Referring to the obtained CQIs, the beams $B_{13}$, $B_{31}$, and $B_{32}$ for which a CQI of a specified level is obtained may be identified among the plurality of beams $B_{11}$, $B_{12}$, $B_{13}$, $B_{21}$, $B_{22}$, $B_{23}$, $B_{31}$, $B_{32}$, and $B_{33}$. The processor 120 may select an antenna module having one of the identified beams $B_{13}$, $B_{32}$, and $B_{33}$ as the first antenna module, and may select an antenna module having another beam as the second antenna module.

The processor 120 may identify, for example, a beam $B_{31}$ 711 for which highest CQI 701 is obtained among the identified beams $B_{13}$, $B_{31}$, and $B_{32}$, and may select the antenna module M3 having the identified beam $B_{31}$ 711 as the first antenna module. The processor 120 may select one of the remaining two beams $B_{13}$ and $B_{32}$ other than the beam $B_{31}$ 711 considered to select the first antenna module among the identified beams $B_{13}$, $B_{31}$, and $B_{32}$, as a candidate beam. An antenna module having the candidate beam may be the second antenna module. The processor 120 may obtain, for example, CQIs 703 and 705 of a similar level among the remaining two beams $B_{13}$ and $B_{32}$, but may select a beam $B_{13}$ 713 belonging to another antenna module M1 as another beam, other than the beam $B_{32}$ belonging to the same antenna module M3 as that of the beam $B_{31}$ 711 in use. In this case, the second antenna module may be the antenna module M1 to which the beam $B_{13}$ 713 selected as another beam belongs. A beam belonging to the same antenna module is not selected because it may not be easy to prevent overheating from occurring in a corresponding antenna module even if selected two beams are alternately used.

The processor 120 may determine the beam $B_{31}$ 711 of the antenna module M3 selected as the first antenna module and the beam $B_{13}$ 713 of the antenna module M1 selected as the second antenna module. Although the beam $B_{13}$ 713 of the antenna module M1 and the beams $B_{31}$ 711 and $B_{32}$ of the antenna module M3 are formed to face different directions, as illustrated in FIG. 7B, the electronic device 101 may measure a signal transmitted by a base station 751 to have high channel quality due to a received signal NON-LOS 723 reflected by an obstacle such as a wall or the like.

In step 605, the electronic device (e.g., the processor 120) may communicate by alternately using selected at least two antenna modules. Upon selecting the first antenna module and the second antenna module, the processor 120 may provide control to repeatedly perform a scheme in which a first beam of a first antenna module is used for communication during a specified time and a second beam of a second antenna module is used for communication during a specified time. For example, as illustrated in FIG. 7A, the processor 120 may communicate by alternately using the beam $B_{31}$ 711 of the antenna module M3 and the beam $B_{13}$ 713 of the antenna module M1. The processor 120 may dynamically change an antenna module used in communication, based on temperature of the selected at least two antenna modules.

Figure 8:
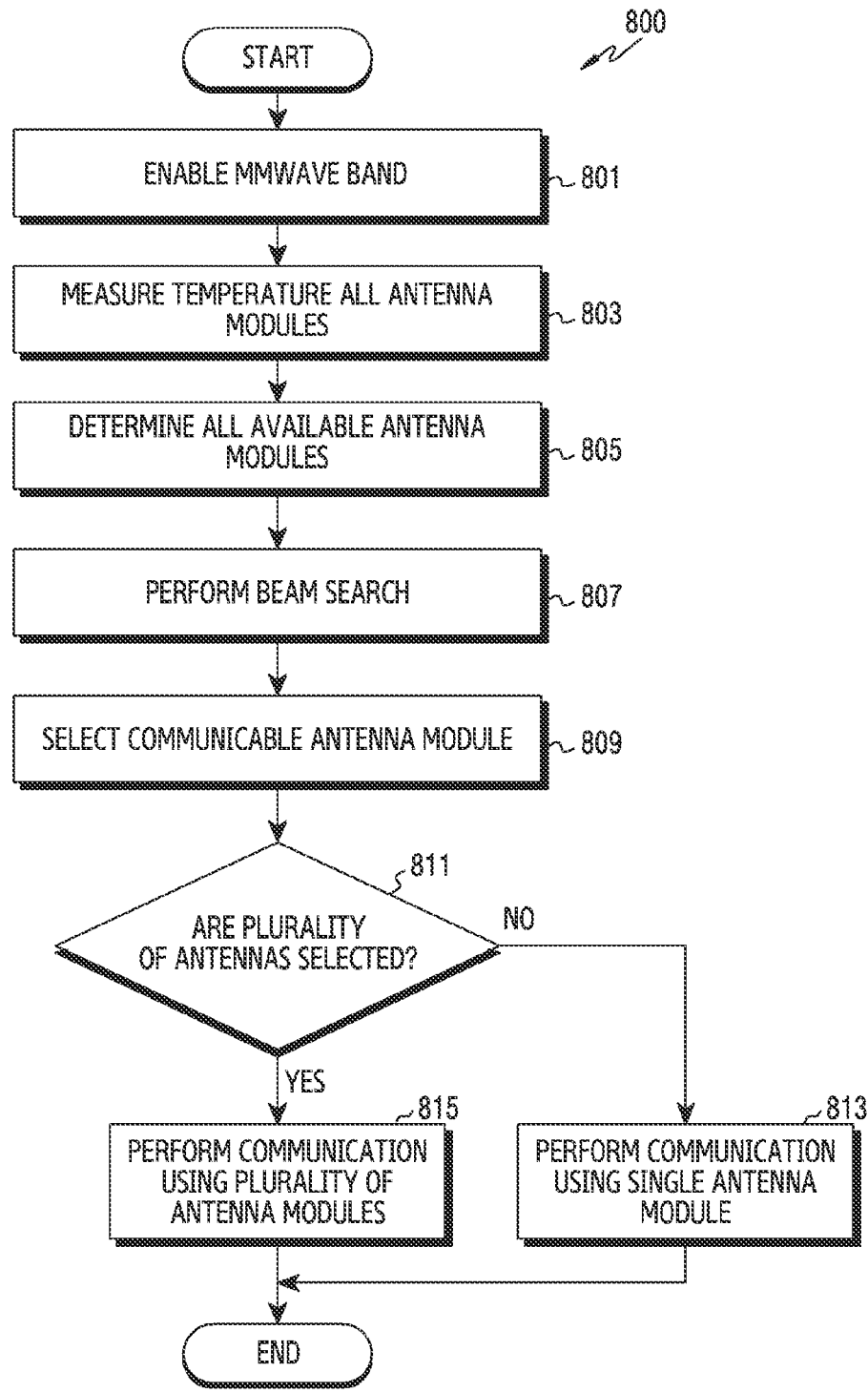
FIG. 8 is a flowchart in which an electronic device performs communication, according to an embodiment.

FIG. 8 is a flowchart 800 in which an electronic device performs communication, according to an embodiment. The electronic device of FIG. 8 may be the electronic device 101 of FIG. 1.

Referring to FIG. 8, in step 801, the electronic device (e.g., the processor 120 of FIG. 1) may enable an ultra-high frequency (mmWave) band. The enabling of the mmWave band may correspond to enabling of a communication function in an electronic device for supporting a 5G-based communication service. The enabling of the communication function may mean that components including a communication module are enabled to support the mmWave band corresponding to a usage frequency band.

After enabling the mmWave band, in step 803, the electronic device (e.g., the processor 120 of FIG. 1) may measure temperature for all antenna modules. When a heterogeneous network including a legacy network and a 5G network is supported for example, the electronic device (e.g., the processor 120 of FIG. 1) may measure only temperature for antenna modules supporting the 5G network among provided antenna modules.

In step 805, the electronic device (e.g., the processor 120 of FIG. 1) may determine one or more available antenna modules among a plurality of antenna modules of which temperature is measured based on measured temperature for each antenna module. The electronic device (e.g., the processor 120 of FIG. 1) may determine whether each of the antenna modules is available, by using a threshold temperature which is set to determine whether it is available. That is, the electronic device (e.g., the processor 120 of FIG. 1) may determine one or more available antennas according to whether the measured temperature exceeds the threshold temperature among the antenna modules.

In step 807, the electronic device (e.g., the processor 120 of FIG. 1) may perform the beam search using one or each of a plurality of available antenna modules. The electronic device (e.g., the processor 120) may form a plurality of beams, for example, by setting register values of phase shifters of one or more respective available antenna modules, and may perform the beam search by using the formed plurality of beams. Since step 807 performed by the electronic device (e.g., the processor 120 of FIG. 1) may be identical to step 601 performed by the electronic device (e.g., the processor 120 of FIG. 1) in FIG. 6, detailed descriptions thereon will be omitted.

In step 809, the electronic device (e.g., the processor 120 of FIG. 1) may select a communicable antenna module from among one or more available antenna modules, based on the beam search result. The electronic device (e.g., the processor 120 of FIG. 1) may obtain, for example, channel quality (e.g., CQI) corresponding to each beam as a result of performing the beam search on each of beams by using one or more available antenna modules, and may select an available antenna module in which the obtained CQI satisfies a threshold as the communicable antenna module. Since step 809 performed by the electronic device (e.g., the processor 120 of FIG. 1) may be identical to step 603 performed by the electronic device (e.g., the processor 120 of FIG. 1) in FIG. 6, detailed descriptions thereon will be omitted.

If the temperature for the antenna module is measured in step 803 and the available antenna module is determined in step 805, the electronic device (e.g., the processor 120 of FIG. 1) may set a threshold to be referred to select the communicable antenna module in step 809 by utilizing the temperature measured in step 803 and the available antenna module determined in step 805.

In step 811, the electronic device (e.g., the processor 120 of FIG. 1) may determine whether a plurality of communicable antenna modules are selected based on the channel quality. The electronic device (e.g., the processor 120 of FIG. 1) may perform step 813 in the presence of one communicable antenna module, and may perform step 815 in the presence of a plurality of communicable antenna modules.

In step 813, the electronic device (e.g., the processor 120 of FIG. 1) may perform communication using a single antenna module. The electronic device (e.g., the processor 120 of FIG. 1) may measure temperature of a corresponding antenna module periodically or aperiodically, for example, while communication is performed using the single antenna module. Upon recognizing that the temperature of the antenna module exceeds the threshold through measurement, the electronic device (e.g., the processor 120 of FIG. 1) may disable the antenna module. After the antenna module is disabled, the electronic device (e.g., the processor 120 of FIG. 1) may persistently measure the temperature of the antenna module, and may enable the antenna module again upon detecting that the temperature is decreased to be lower than or equal to a specific level.

In step 815, the electronic device (e.g., the processor 120 of FIG. 1) may perform communication by using the previously selected plurality of antenna modules. The electronic device (e.g., the processor 120 of FIG. 1) may perform, for example, communication depending on two types of operation modes.

The electronic device (e.g., the processor 120 of FIG. 1) may perform communication by using a single antenna module among the selected plurality of antenna modules, and when temperature of the single antenna module exceeds the threshold, may perform communication by using all of the plurality of antenna module or by using one antenna module selected alternately from among the plurality of antenna modules.

Alternatively, the electronic device (e.g., the processor 120 of FIG. 1) may perform communication by using all of the plurality of antenna modules selected initially or by using one antenna module selected alternately from among the selected plurality of antenna modules.

Figure 9:
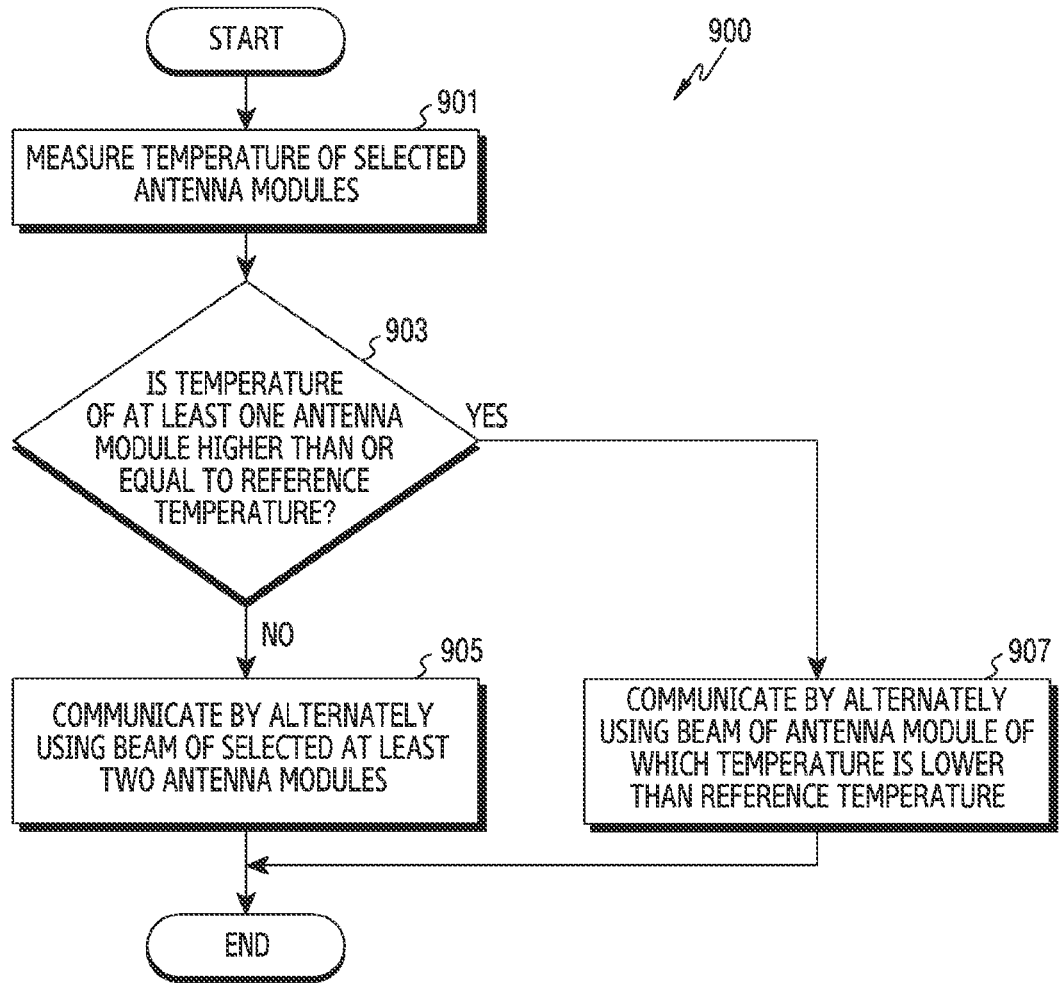
FIG. 9 is a flowchart in which an electronic device communicates based on temperature, according to an embodiment.

FIG. 9 is a flowchart 900 in which an electronic device communicates based on temperature, according to an embodiment. The electronic device of FIG. 9 may be the electronic device 101 of FIG. 1. The description of FIG. 9 below provides a detailed operation of step 605 of FIG. 6.

Referring to FIG. 9, in step 901, the electronic device (e.g., the processor 120 of FIG. 1) may measure temperature of selected antenna modules. The temperature of the selected antenna modules may be obtained, for example, as temperature for antenna modules selected from among all of antenna modules, based on temperature for each antenna module, periodically measured for all of the antenna modules. As another embodiment, the electronic device (e.g., the processor 120 of FIG. 1) may regularly monitor temperature of one or more antenna modules selected from among all of the antenna modules.

The processor 120 may measure temperature of at least two antenna modules selected in step 603 of FIG. 6. Each of the selected at least two antenna modules radiate heat while being used for communication, as in step 605 of FIG. 6. According to an embodiment, the processor 120 may periodically measure temperature of each of at least two antenna modules used alternately or by turn for communication.

In step 903, the electronic device (e.g., the processor 120) may determine whether temperature of at least one antenna module is higher than or equal to reference temperature. For example, the processor 120 may determine whether temperature of at least one of two or more antenna modules used alternately for communication is higher than or equal to the reference temperature. The reference temperature may be set to be lower than temperature (e.g., about 80 degrees) at which an antenna module is not usable due to overheating. The reference temperature may be set to, for example, about 60 degrees. The reference temperature may be set and/or changed by a business operator and/or a designer.

When the temperature of the at least one antenna module is higher than or equal to the reference temperature, in step 907, the electronic device (e.g., the processor 120) may communicate by using a beam of an antenna module of which temperature is lower than the measured reference temperature among the selected antenna modules. For example, when two antenna modules are in use for communication and temperature of a first antenna module of the two antenna modules is higher than specified temperature and temperature of a second antenna module is lower than the specified temperature, the processor 120 may communicate by using only a beam of the second antenna module other than the first antenna module. When the temperature of the first antenna module is measured to be lower than the specified temperature while communication is performed by using only the beam of the second antenna module, the processor 120 may communicate by alternately using the first antenna module and the second antenna module.

When the temperature of the at least one antenna module is not higher than or equal to the reference temperature (when the temperature of all of selected antenna modules is lower than the reference temperature), in step 905, the electronic device (e.g., the processor 120) may communicate by alternately using a beam of the selected antenna modules. For example, when two antenna modules are in use for communication and temperature of each of two antenna modules is lower than specified temperature, the processor 120 may continuously maintain a state in which communication is performed by alternately using beams of the two antenna module.

Figure 10:
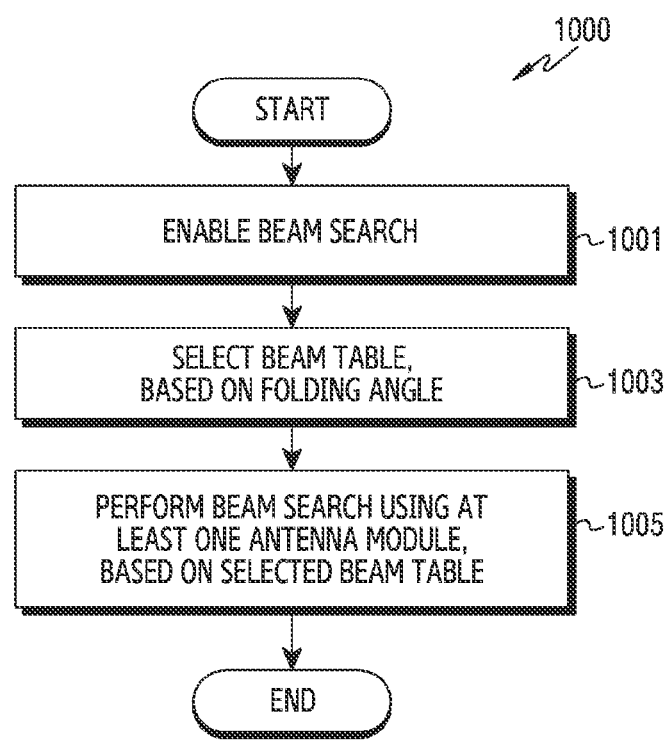
FIG. 10 is a flowchart in which an electronic device performs a beam search, based on a folding angle, according to an embodiment.

FIG. 10 is a flowchart 1000 in which an electronic device performs a beam search, based on a folding angle, according to an embodiment. The electronic device of FIG. 10 may be the electronic device 101 of FIG. 1. The description of FIG. 10 below provides a detailed operation of step 601 of FIG. 6.

Referring to FIG. 10, in step 1001, the electronic device (e.g., the processor 120 of FIG. 1) may enable the beam search. Enabling of the beam search may be detected at the occurrence of a communication event using beamforming or may be detected every pre-set period.

In step 1003, the electronic device (e.g., the processor 120) may select a beam table corresponding to a folding condition. The electronic device (e.g., the processor 120) may select a beam table corresponding to a folding angle (or a mechanical state) of the electronic device 101 from among a plurality of beam tables stored in a memory (e.g., the memory 130 of FIG. 1). For example, the memory 130 may store a first beam table corresponding to a first folding angle of the electronic device 101 and a second beam table corresponding to a second folding angle. Each of the plurality of beam tables may be set by considering a permittivity change depending on a change in the folding angle of the electronic device 101. One beam table may include register values of phase shifters respectively included in the plurality of antenna modules.

In step 1005, the electronic device (e.g., the processor 120) may perform the beam search using at least one antenna module, based on the selected beam table. For example, when the folding able corresponds to a first specified angle range (e.g., between about 0 degrees and about 175 degrees), the electronic device (e.g., the processor 120) may form a plurality of beams by setting register values of phase shifters of at least one antenna module, based on a first beam table corresponding to a first specified angle, and may perform the beam search by using the formed plurality of beams. As another example, when the folding angle corresponds to a second specified angle range (e.g., between about 175 degrees and about 185 degrees), the electronic device (e.g., the processor 120) may form a plurality of beams by setting the register values of the phase shifters of the at least one antenna module, based on a second beam table corresponding to a second specified angle, and may perform the beam search by using the formed plurality of beams.

The electronic device (e.g., the processor 120) may perform, for example, the beam search by using all antenna modules defined by the beam table selected according to the folding condition (the folding angle), or may perform the beam search by using only some antenna modules.

Figure 11:
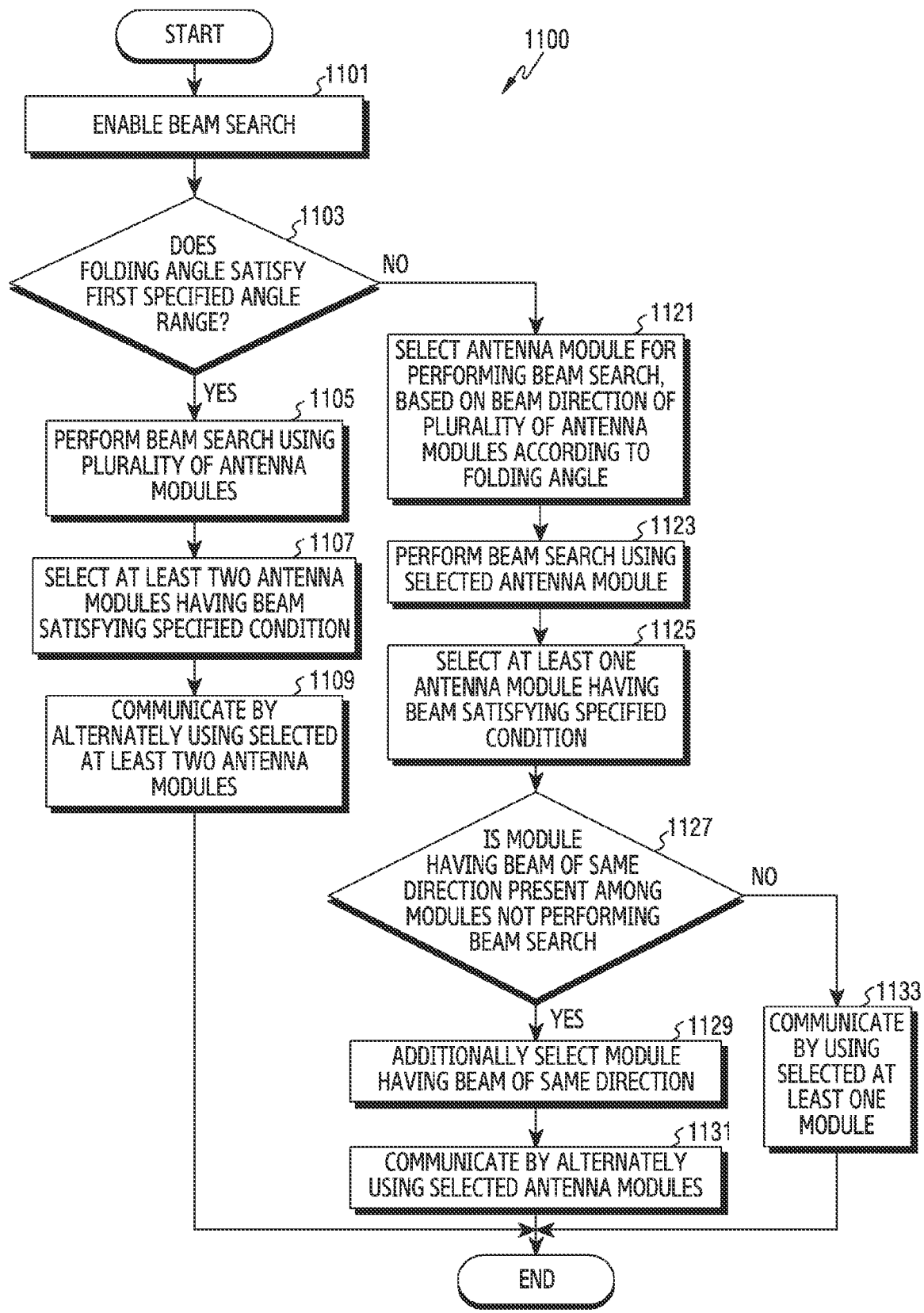
FIG. 11 is a flowchart in which an electronic device selects at least one antenna module and communicates, based on a folding angle, according to an embodiment.

FIG. 11 is a flowchart 1100 in which an electronic device selects at least one antenna module and communicates, based on a folding angle, according to an embodiment. The electronic device of FIG. 11 may be the electronic device 101 of FIG. 1. Operations of FIG. 11 described below may be a detailed operation of steps 601 and 603 of FIG. 6. At least some operations of FIG. 11 will be described below with reference to FIG. 12A, FIG. 12B, and FIG. 13A to FIG. 13C.

Figure 12A:
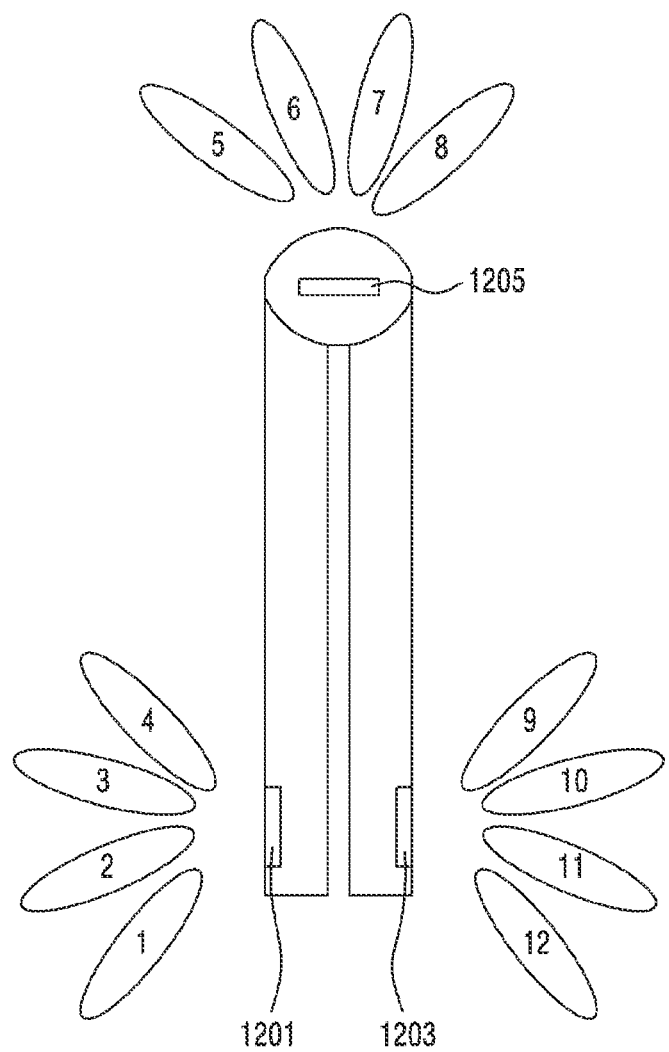
FIG. 12A and FIG. 12B illustrate an electronic device selecting at least one antenna module when a folding angle satisfies a first specified angle condition, according to an embodiment.
Figure 12B:
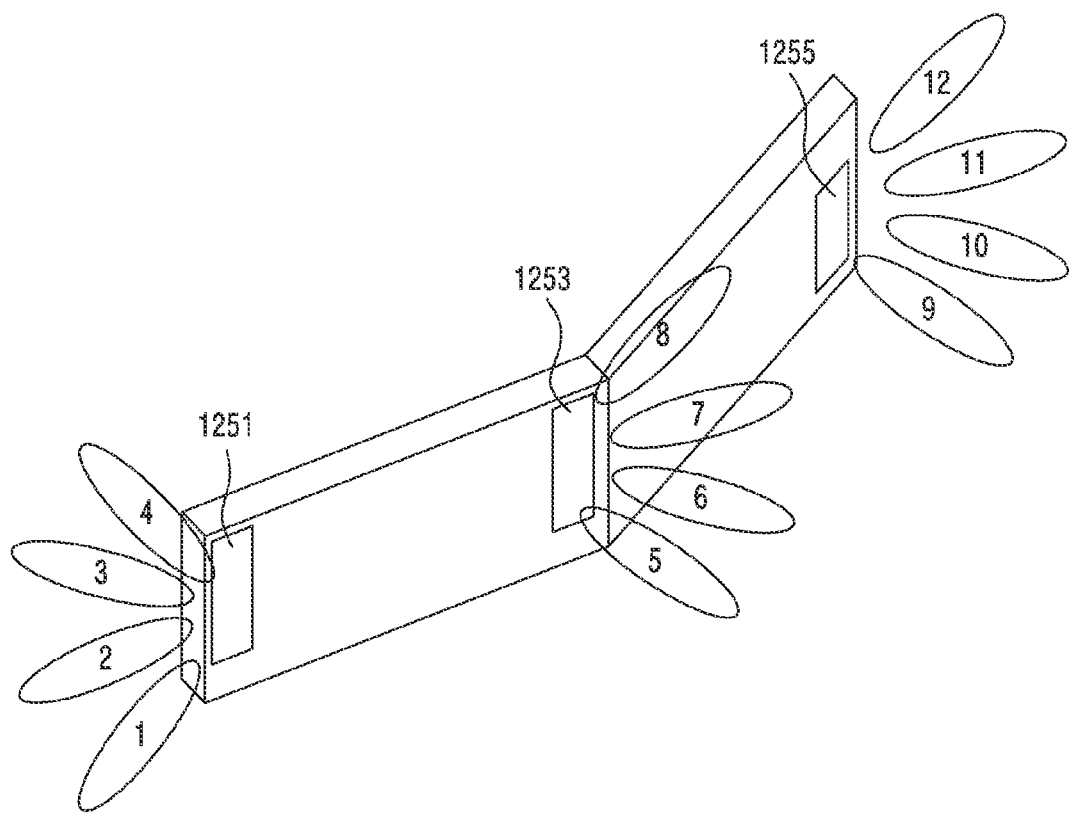
Figure 13A:
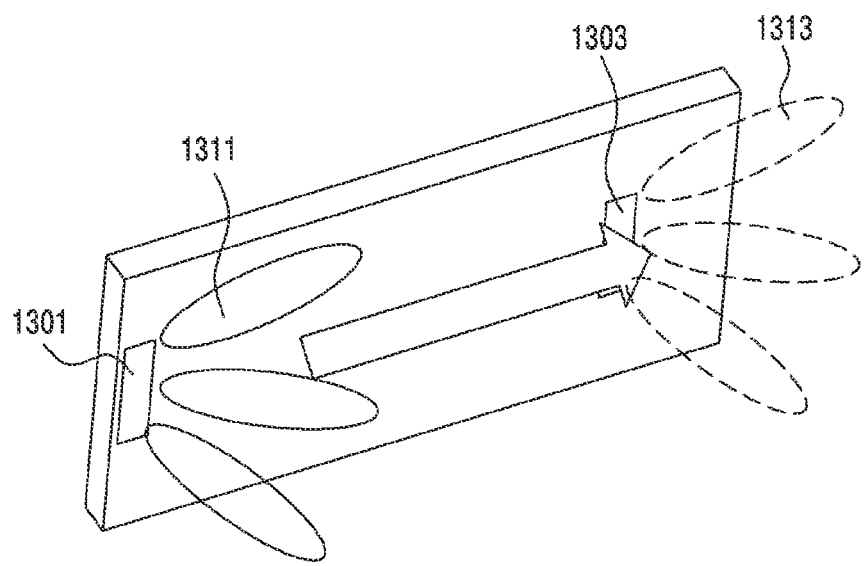
FIG. 13A to FIG. 13C illustrate an electronic device selecting at least one antenna module when a folding angle satisfies a second specified angle condition, according to an embodiment.
Figure 13B:
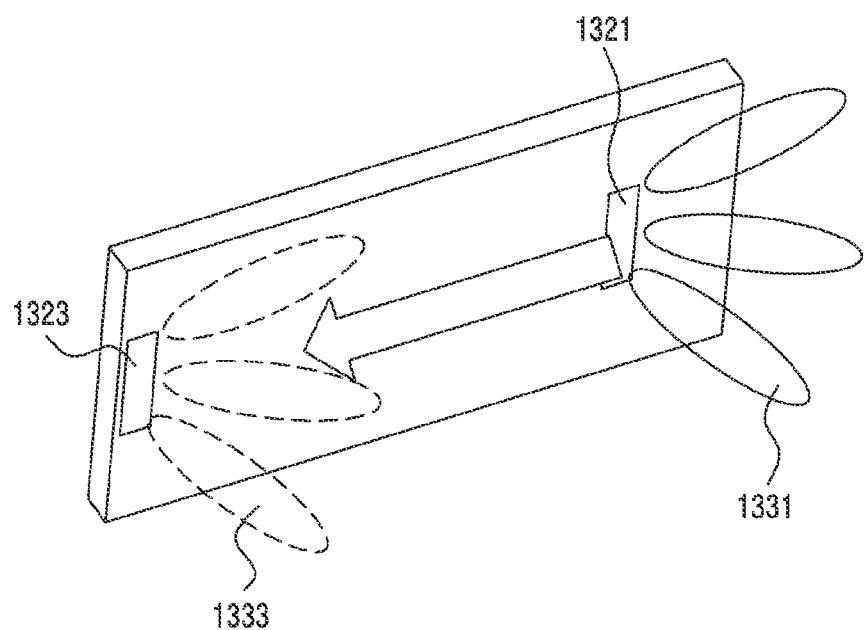
Figure 13C:
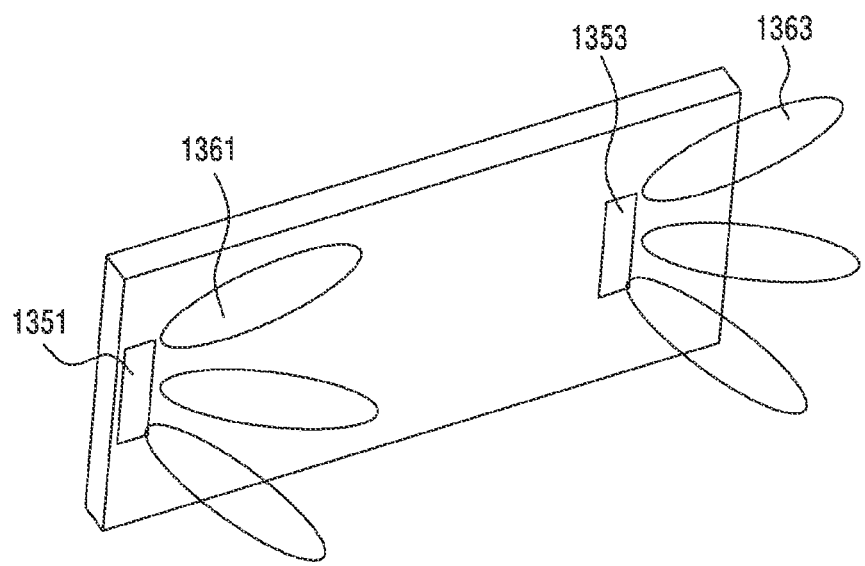

FIG. 12A and FIG. 12B illustrate an electronic device selecting at least one antenna module when a folding angle satisfies a first specified angle condition, according to an embodiment. FIG. 13A to FIG. 13C illustrates an electronic device selecting at least one antenna module when a folding angle satisfies a second specified angle condition, according to an embodiment.

Referring to FIG. 11, in step 1101, the electronic device (e.g., the processor 120 of FIG. 1) may detect a beam search event. The operation of detecting the beam search event may be the same as step 1001 of FIG. 10.

In step 1103, the electronic device (e.g., the processor 120) may determine whether the folding angle satisfies a first specified angle range. For example, the processor 120 may determine whether an angle between a first housing structure (e.g., the first housing structure 310 of FIG. 3A) and second housing structure (e.g., the second housing structure 320 of FIG. 3B) of the electronic device 101 satisfies the first specified angle range. As another example, the processor 120 may determine whether a folding angle of a display (e.g., the foldable display 311 of FIG. 3) of the electronic device 101 satisfies the first specified angle range. The first specified angle range may include, for example, an angle indicating a fully folded state (or closed state) of the electronic device 101 as illustrated in FIG. 12A or a partially folded state as illustrated in FIG. 12B. The first specified angle range may include at least one of an angle range between about 0 degrees and about 175 degrees and an angle range between about 185 degrees and about 360 degrees. The first specified angle range may be set and/or changed by a business operator and/or a designer.

When the folding angle of the electronic device 101 satisfies the first specified angle range, in step 1105, the electronic device (e.g., the processor 120) may perform a beam search using a plurality of antenna modules. For example, the processor 120 may perform the beam search by using all antenna modules included in the electronic device 101. The beam search operation may be the same as step 601 of FIG. 6. For example, when the electronic device 101 is in the fully folded state as illustrated in FIG. 12A or when the electronic device 101 is in the partially folded state as illustrated in FIG. 12B, a folding angle of the electronic device 101 may satisfy the first specified angle range. When the folding angle of the electronic device 101 satisfies the first specified angle range, the processor 120 may perform the beam search by using all antenna modules 1201, 1203, 1205, 1251, 1253, and 1255 provided in the electronic device 101. This is because a plurality of beams formable through the plurality of antenna modules face different directions while the folding angle of the electronic device 101 satisfies the first specified angle.

In step 1107, the electronic device (e.g., the processor 120) may select at least two antenna modules having a beam satisfying a specified condition, based on a result of performing the beam search. Step 1107 of selecting the antenna module may be the same as step 603 of FIG. 6.

In step 1109, the electronic device (e.g., the processor 120) may communicate by alternately using the selected at least two antenna modules. The operation of performing communication by alternately using the selected at least two antenna modules may be the same as step 605 of FIG. 6.

When the folding angle of the electronic device 101 does not satisfy the first specified angle range (or when the folding angle satisfies a second specified angle range), in step 1121, the electronic device (e.g., the processor 120) may select at least one antenna module for performing the beam search, based on a beam direction of a plurality of antenna modules according to the folding angle. When the folding angle of the electronic device 101 does not satisfy the first specified angle range, the processor 120 may determine that the folding angle of the electronic device 101 satisfies the second specified angle range. The second specified angle range may include, for example, an angle indicating a fully flat state of the electronic device 101 as illustrated in FIG. 13A to FIG. 13C. For example, the second specified angle range may include an angle range between about 175 degrees and about 185 degrees. The second specified angle range may be set and/or changed by a business operator and/or a designer. The processor 120 may determine whether a plurality of antenna modules which form beams in the same direction are present, while the folding angle of the electronic device 101 satisfies the second specified angle range. When a direction of beams of the first antenna module is the same as a direction of beams of the second antenna module, the processor 120 may select only one of the first antenna module and the second antenna module as the antenna module for performing the beam search. For example, when the electronic device 101 is in the fully flat state as illustrated in FIG. 13A and FIG. 13B, a direction of beams formable in a first antenna module 1301 may be the same as a direction of beams formable in a second antenna module 1303. The processor 120 may select only the first antenna module 1301 as the module for performing the beam search as illustrated in FIG. 13A, or may select only a second antenna module 1321 as the module for performing the beam search as illustrated in FIG. 13B.

In step 1123, the electronic device (e.g., the processor 120) may perform the beam search by using selected at least one antenna module. For example, when only the first module 1301 is selected, as illustrated in FIG. 13A, the processor 120 may measure channel quality for each of beams of the first antenna module 1301 by performing the beam search only on the beams of the first antenna module 1301. As another example, when only the second antenna module 1321 is selected, as illustrated in FIG. 13B, the processor 120 may measure channel quality for each of beams of the second antenna module 1321 by performing the beam search only on the beams of the second antenna module 1321.

In step 1125, the electronic device (e.g., the processor 120) may select at least one antenna module having a beam satisfying a specified condition as an antenna module for communication, based on a beam search result. For example, the processor 120 may identify a beam with highest channel quality while satisfying specified channel quality among beams of which channel quality is measured through a beam search, and may select an antenna module having the identified beam as the antenna module for communication. For example, as illustrated in FIG. 13A, when channel quality for beams of the first antenna module 1301 is measured, the processor 120 may identify a presence of a first beam 1311 of which channel quality is measured to be the highest while satisfying specified channel quality. The processor 120 may select the first antenna module 1301 having the first beam 1311 as the antenna module for communication. As another example, as illustrated in FIG. 13B, when channel quality for beams of the second antenna module 1321 is measured, the processor 120 may identify a presence of a first beam 1331 of which channel quality is measured to be the highest while satisfying specified channel quality. The processor 120 may select the first antenna module 1321 having the first beam 1331 as the antenna module for communication.

In step 1127, the electronic device (e.g., the processor 120) may determine whether there is a module having a beam of the same direction as a beam direction of the selected antenna module for communication, among modules not performing a beam search. The module not performing the beam search may be an antenna module not selected in step 1121. For example, as illustrated in FIG. 13A, the beam search may be performed on the first antenna module 1301, and the beam search may not be performed on the second antenna module 1303. When the first antenna module 1301 is selected by the first beam 1311 of the first antenna module 1301, the processor 120 may determine whether the second antenna module 1303 has a beam of the same direction as the first beam 1311 of the first antenna module 1301. As another example, as illustrated in FIG. 13B, the beam search may be performed on the second antenna module 1321, and the beam search may not be performed on a first antenna module 1323. When the second antenna module 1321 is selected by the first beam 1331 of the second antenna module 1321, the processor 120 may determine whether the first antenna module 1323 not performing the beam search has a beam of the same direction as the first beam 1331 of the second antenna module 1321.

In the presence of the module having the beam of the same direction, in step 1129, the electronic device (e.g., the processor 120) may additionally select the module having the same of the same direction as the beam direction of the selected antenna module for communication, as the antenna module for communication.

As illustrated in FIG. 13A, when the second antenna module 1303 has a beam of the same direction as the first beam 1311 of the first antenna module 1301, the processor 120 may additionally select the second antenna module 1303 as the antenna module for communication. During a communication duration in which the second antenna module 1303 is used, the processor 120 may allow the second beam 1313 having the same direction as the first beam 1311 of the first antenna module 1301 to be used among beams of the second antenna module 1303.

As illustrated in FIG. 13B, when the first antenna module 1323 has a beam of the same direction as the second beam 1331 of the second antenna module 1321, the processor 120 may additionally select the first antenna module 1323 as the antenna module for communication. During a communication duration in which the first antenna module 1323 is used, the processor 120 may allow the second beam 1313 having the same direction as the first beam 1331 of the second antenna module 1321 to be used among beams of the first antenna module 1323.

Whether to have the beam of the same direction may be determined based on information on a relationship between communication modules, stored in a memory (e.g., the memory 130 of FIG. 1). The information the relationship between the communication modules may include information on communication modules having beams of the same direction according to an angle of the electronic device 101. For example, when the electronic device 101 is in a fully flat state, the information on the relationship between the communication modules may include at least one of information indicating communication modules having beams of the same direction and beam direction information of each communication module.

Whether to have the beam of the same direction may be determined based on at least one of register values of phase shifters of respective antenna modules included in a beam table, an arrangement position of each antenna module, and a folding angle.

In step 1131, the electronic device (e.g., the processor 120) may communicate by alternately using the selected antenna modules for communication. For example, as illustrated in FIG. 13A and FIG. 13B, when the electronic device 101 is in the fully flat state, the processor 120 may communicate by alternately using the first beams 1311 and 1333 of the first antenna modules 1301 and 1313 and the second beams 1313 and 1331 of the second antenna modules 1303 and 1321.

In step 1131, the electronic device (e.g., the processor 120) may perform communication by using one of the selected plurality of antenna modules for communication, and when temperature of the antenna module in use for communication exceeds a threshold, may communicate by enabling all antenna modules for communication or some antenna modules for communication (two or more antenna modules for communication). For example, as illustrated in FIG. 13C, when the electronic device 101 is in the fully flat state, the processor 120 may communicate by using both a first beam 1361 of a first antenna module 1351 and a second beam 1363 of a second antenna module 1353.

In the absence of the module having the beam of the same direction, in step 1133, the electronic device (e.g., the processor 120) may communicate by using selected at least one module. For example, in step 1133, the processor 120 may communicate by using a beam of at least one communication module selected as the antenna module for communication. When a single antenna module is selected as the antenna module for communication, the processor 120 may communicate by using a beam identified in the single antenna module. When at least two antenna modules are selected as the antenna module for communication, the processor 120 may communicate by alternately using respective beams of the selected at least two antenna modules.

Although the above description relates to a scheme in which a beam search is performed by selecting only one antenna module out of two antenna modules which form the same beam direction when the electronic device 101 is in the fully flat state, it is also possible that the beam search is performed by selecting all of the two antenna modules according to a design scheme. For example, as illustrated in FIG. 13C, even if the electronic device 101 is in the fully flat state, the first antenna module 1351 and the second antenna module 1353 may be selected as modules for performing the beam search. Based on a beam search result for each of the first antenna module 1351 and the second antenna module 1353, the processor 120 may identify that the at least two beams 1361 and 1363 are beams with highest channel quality while satisfying specified channel quality, and may select the first antenna module 1351 and the second antenna module 1353 as the antenna module for communication.

Figure 14:
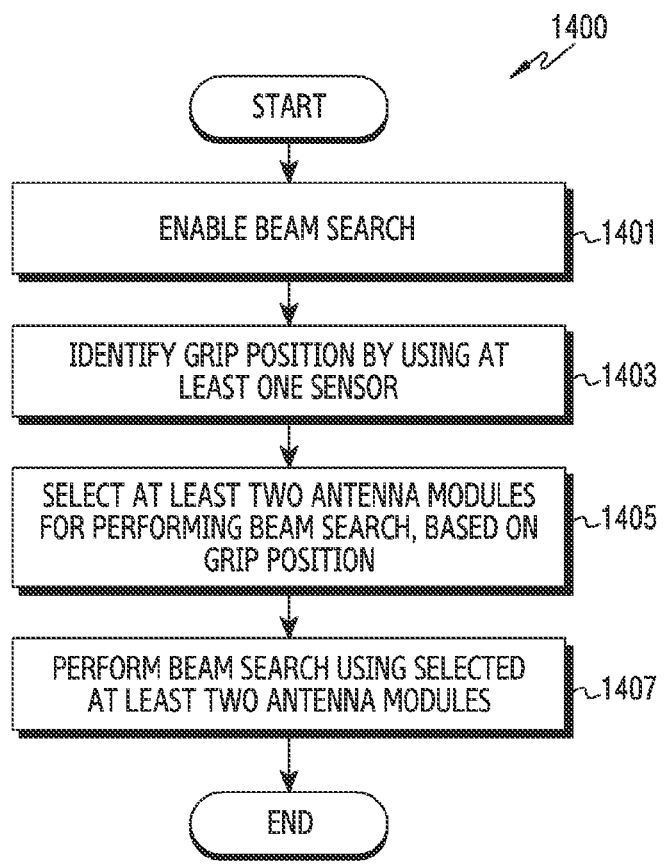
FIG. 14 is a flowchart in which an electronic device performs a beam search, based on a position gripped by a user, according to an embodiment.

FIG. 14 is a flowchart 1400 in which an electronic device performs a beam search, based on a position gripped by a user, according to an embodiment. The electronic device of FIG. 14 may be the electronic device 101 of FIG. 1. Operations of FIG. 14 described below may be a detailed operation of step 601 of FIG. 6, or an operation performed after step 605 of FIG. 6. At least some operations of FIG. 14 will be described below with reference to FIG. 15.

Referring to FIG. 14, in step 1401, the electronic device (e.g., the processor 120 of FIG. 1) may enable the beam search. The operation of enabling the beam search may be the same as step 1001 of FIG. 10.

In step 1403, the electronic device (e.g., the processor 120) may identify a grip position by using at least one sensor (e.g., the sensor module 176 of FIG. 1). For example, the processor 120 may identify a position at which the electronic device 101 is gripped by a user's hand by using the at least one sensor. For example, the processor 120 may compare the grip position detected by using the at least one sensor 176 and a position which is stored in a memory (e.g., the memory 130 of FIG. 1) and at which each of the plurality of antenna modules is disposed, and may determine whether the grip position corresponds to the position at which at least one antenna module is disposed.

Figure 15:
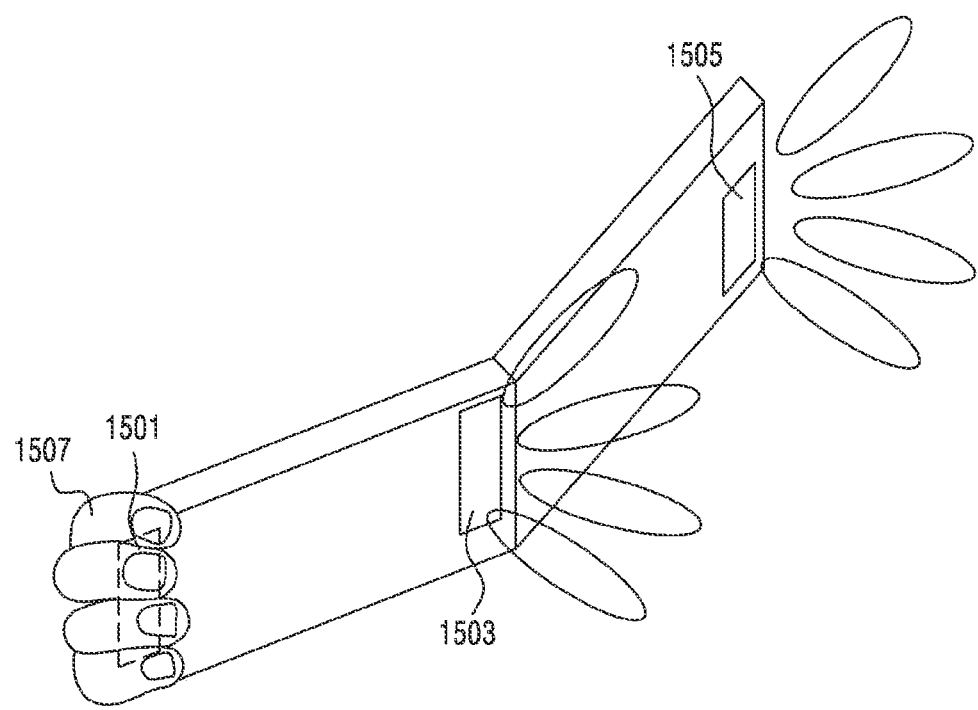
FIG. 15 illustrates an electronic device selecting an antenna module for performing a beam search based on a position gripped by a user, according to an embodiment.

In step 1405, the electronic device (e.g., the processor 120) may select at least two antenna modules for performing the beam search, based on the grip position. When the grip position corresponds to the position at which the at least one antenna module is disposed, the processor 120 may exclude at least one antenna module corresponding to the grip position from the antenna module for performing the beam search. The processor 120 may select at least two antenna modules corresponding to a position not gripped by a user, as the module for performing the beam search. For example, as illustrated in FIG. 15, when a user's hand 1507 is positioned at the first antenna module 1501, the remaining modules 1503 and 1505 may be selected as the module for performing the beam search.

In step 1407, the electronic device (e.g., the processor 120) may perform the beam search using selected at least two antenna modules. For example, as illustrated in FIG. 15, when the second antenna module 1503 and the third antenna module 1505 are selected, the processor 120 may measure channel quality for beams of the second antenna module 1503 and third antenna module 1505.

The electronic device (e.g., the processor 120) may perform communication including the beam search by using one antenna module out of the selected at least two antenna modules. While communication is performed using a single antenna module, the electronic device (e.g., the processor 120) may measure temperature of the single antenna module in use periodically or aperiodically. When the temperature of the single antenna in use is increased to be higher than or equal to a specific level (a threshold), the electronic device (e.g., the processor 120) may perform communication by using the selected at least two antenna modules together, or may alternately use the selected at least two antenna modules. When the selected at least two antenna modules are alternately used, the electronic device (e.g., the processor 120) may adjust a duty cycle by considering a temperature difference between the antenna modules.

The adjustment of the duty cycle may control heating in the selected at least two antenna modules. For example, out of the two antenna modules, an antenna module having relatively high temperature may be allowed to operate as an antenna module #1, and an antenna module having relatively low temperature may be allowed to operate as an antenna module #2.

Figure 16:
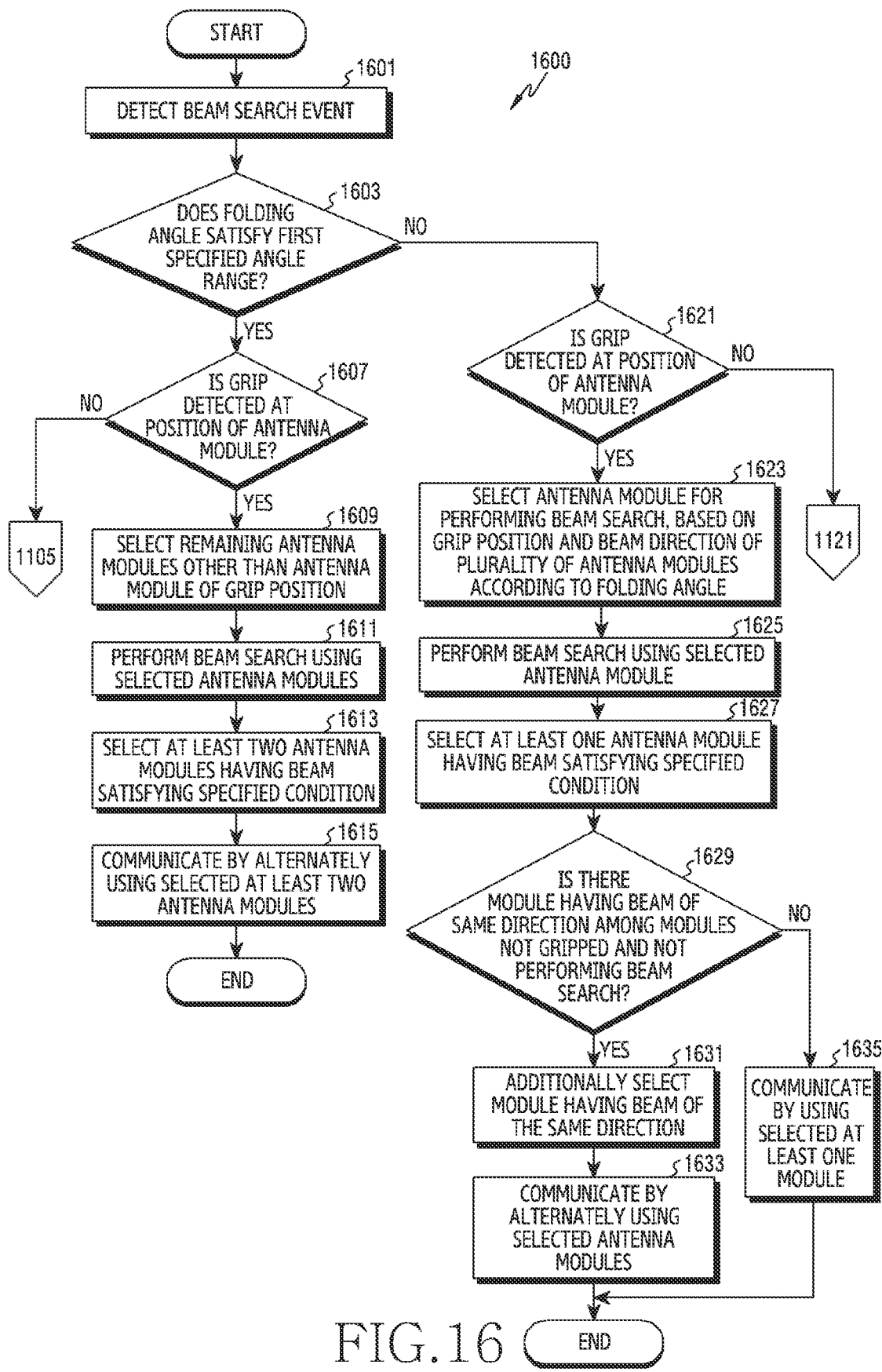
FIG. 16 is a flowchart in which an electronic device communicates by selecting at least one antenna module, based on a folding angle and a grip position, according to an embodiment.
Figure 17:
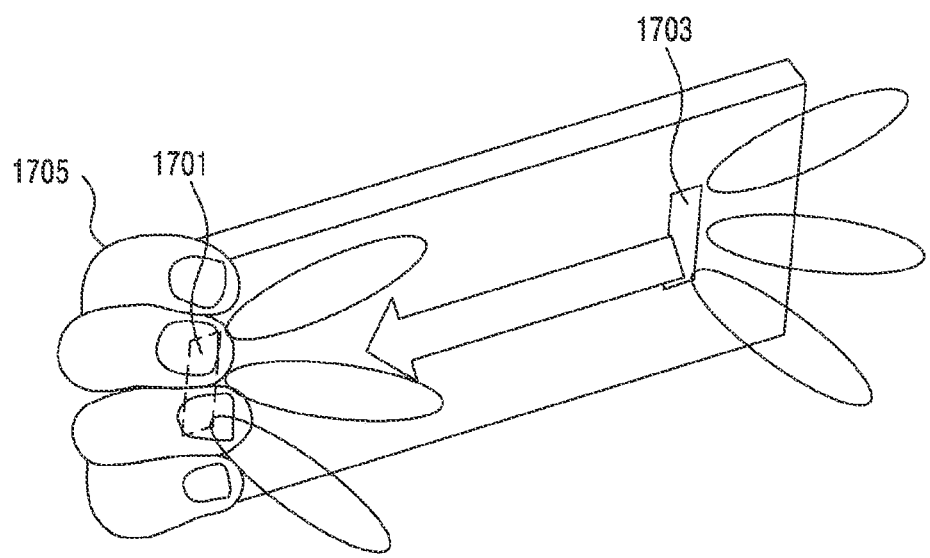
FIG. 17 illustrates an electronic device communicating by selecting at least one antenna module, based on a folding angle and a grip position, according to an embodiment.

FIG. 16 is a flowchart 1600 in which an electronic device communicates by selecting at least one antenna module, based on a folding angle and a grip position, according to an embodiment. The electronic device of FIG. 16 may be the electronic device 101 of FIG. 1. The description of FIG. 16 provided below provides a detailed operation of steps 601 and 603 of FIG. 6. At least some operations of FIG. 16 will be described below with reference to FIG. 17. FIG. 17 is an exemplary diagram in which an electronic device communicates by selecting at least one antenna module, based on a folding angle and a grip position, according to an embodiment.

Referring to FIG. 16, in step 1601, the electronic device (e.g., the processor 120 of FIG. 1) may detect a beam search event. Step 1601 may be the same as step 1101 of FIG. 11.

In step 1603, the electronic device (e.g., the processor 120) may determine whether the folding angle satisfies a first specified angle range. Step 1603 may be the same as step 1103 of FIG. 11.

When the folding angle satisfies the first specified angle range, in step 1607, the electronic device (e.g., the processor 120) may determine whether a grip on a position at which at least one antenna module is disposed is detected Step 1607 may be the same at least in part as step 1403 of FIG. 14. The processor 120 may determine a user's grip position detected by using at least one sensor, and may determine whether the determined grip position corresponds to the position at which the antenna module is disposed.

When the grip on the position at which the at least one antenna module is disposed is not detected (or when the grip position is not the position at which the at least one antenna module is disposed), at step 1105 of FIG. 11, the electronic device (e.g., the processor 120) may perform subsequent operations.

When the grip on the position at which the at least one antenna module is disposed is detected (or when the grip position is the position at which the at least one antenna module is disposed), in step 1609, the electronic device (e.g., the processor 120) may select the remaining antenna modules other than an antenna module corresponding to the grip position. For example, when a user grips a position at which at least one antenna module is disposed, the processor 120 may predict that performance of the antenna module is not good, and may exclude the antenna module from the antenna module for performing the beam search. For example, the processor 120 may predict that channel quality for beams of the antenna module does not satisfy specified channel quality due to the user's grip, and may exclude the antenna module from the antenna module for performing the beam search.

In step 1611, the electronic device (e.g., the processor 120) may perform the beam search using the selected antenna modules. For example, the processor 120 may measure channel quality for beams of the selected antenna modules.

In step 1613, the electronic device (e.g., the processor 120) may select at least two antenna modules having a beam satisfying a specified condition, based on a beam search result. Step 1613 may be the same as step 603 of FIG. 6.

In step 1615, the electronic device (e.g., the processor 120) may communicate by alternately using selected at least two antenna modules. For example, when temperature of one antenna module in use is increased to be higher than or equal to a threshold while performing communication using one antenna module, the electronic device (e.g., the processor 120) may perform communication by using at least two antenna modules alternately or together. Step 1615 may be the same as step 605 of FIG. 6.

When the folding angle does not satisfy a first specified angle range (or when the folding angle satisfies a second specified angle range), in step 1621, the electronic device (e.g., the processor 120) may determine whether a grip on a position at which at least one antenna module is disposed is detected. Step 1621 may be the same at least in part as step 1403 of FIG. 14. The processor 120 may determine a user's grip position detected by using at least one sensor, and may determine whether the determined grip position corresponds to the position at which the antenna module is disposed.

When the grip on the position at which at least one antenna module is disposed is not detected (or when the grip position is not the position at which the at least one antenna module is disposed), proceeding to step 1121 of FIG. 11, the electronic device (e.g., the processor 120) may perform subsequent operations.

When the grip on the position at which the at least one antenna module is disposed is detected (or when the grip position is the position at which the at least one antenna module is disposed), in step 1623, the electronic device (e.g., the processor 120) may select an antenna module for performing a beam search, based on at least one of a grip position and a beam direction of a plurality of antenna modules according to the folding angle.

The processor 120 may exclude an antenna module disposed to the grip position among the plurality of antenna modules included in the electronic device 101. For example, as illustrated in FIG. 17, the processor 120 may exclude a first antenna module 1701 disposed to a position gripped by a user's hand 1705 from the antenna module for performing the beam search.

The processor 120 may exclude the antenna module disposed to the grip position among the plurality of antenna modules, and may determine whether modules which form beams of the same direction are present among the remaining antenna modules. When the modules which form beams of the same direction are present among the remaining antenna modules, the processor 120 may select only one of the modules as the module for performing the beam search. When the modules which form the beams of the same direction are not present among the remaining antenna modules, the processor 120 may select the remaining antenna modules as the modules for performing the beam search.

In step 1625, the electronic device (e.g., the processor 120) may perform the beam search using the selected antenna module. For example, the processor 120 may measure channel quality for beams of the selected at least one antenna module.

In step 1627, the electronic device (e.g., the processor 120) may select at least one antenna module having a beam satisfying a specified condition, based on a beam search result. Step 1672 may be the same as step 1125. For example, as illustrated in FIG. 17, when channel quality is measured for beams of a second antenna module 1703, one beam of which channel quality is measured to be the highest while satisfying the specified channel quality may be selected, and the second antenna module 1703 including the identified beam may be selected as the antenna module for communication.

In step 1629, the electronic device (e.g., the processor 120) may determine whether there is a module having a beam of the same direction among modules not gripped and not performing the beam search. For example, the processor 120 may identify an antenna module not gripped by a user among the antenna modules not performing the beam search, and may determine whether there is an antenna module having the same direction as a beam direction of selected at least one antenna module having a beam satisfying a specified condition among the identified antenna modules.

In the presence of the module having the beam of the same direction among the modules not gripped and not performing the beam search, in step 1631, the electronic device (e.g., the processor 120) may additionally select a module having a beam of the same direction. For example, among the modules not performing the beam search and not gripped by the user, the processor 120 may additionally select a module having a beam of the same direction as the beam direction of the antenna module selected as the antenna module for communication, as the antenna module for communication.

In step 1633, the electronic device (e.g., the processor 120) may communicate by alternately using the selected antenna modules. For example, the processor 120 may communicate by alternately using a beam of at least one antenna module selected in step 1627 and a beam of an antenna module additionally selected in step 1631. For example, when temperature of at least one antenna module in use is increased to be higher than or equal to a threshold while performing communication by using at least one antenna module selected in step 1627, the electronic device (e.g., the processor 120) may perform communication by using the at least one antenna module in use and the antenna module additionally selected in the operation 1631 alternately or together.

In the absence of the module having the beam of the same direction among the module not gripped and not performing the beam search, in step 1635, the electronic device (e.g., the processor 120) may communicate by using selected at least one module. For example, in step 1627, the processor 120 may communicate by using a beam of at least one communication module selected as the antenna module for communication. When a single antenna module is selected as the antenna module for communication, the processor 120 may communicate by using a beam identified in the single antenna module. When at least two antenna modules are selected as the antenna module for communication, the processor 120 may communicate by alternately using respective beams of the selected at least two antenna modules. Even if the at least two antenna modules are selected as the antenna module for communication, when temperature of one antenna in use is increased to be higher than or equal to a threshold while performing communication by using one of the selected two antenna module, the selected at least two antenna modules may be used alternately or together for communication.

Accordingly, a method of operating the electronic device 101 is provided that includes performing a beam search on a plurality of antenna modules included in the electronic device 101, selecting at least two antenna modules allowing a beam satisfying a specified condition to be formed among the plurality of antenna modules, based on a result of the beam search, and communicating by alternately using the selected at least two antenna modules.

The selecting of the at least two antenna modules may include selecting a first antenna module which allows a first beam satisfying a first specified condition to be formed among a plurality of beams formable by the plurality of antenna modules, and selecting a second antenna module which allows a second beam satisfying a second specified condition to be formed among a plurality of beams formable by at least one antenna module other than the first antenna module among the plurality of antenna modules. At least one of the first specified condition and the second specified condition may include a condition for channel quality.

The communicating by alternately using the selected at least two antenna modules may include measuring temperature for the plurality of antenna modules, disabling an antenna module, of which measured temperature exceeds a first threshold, out of the selected two antenna modules so that the antenna module is not used in communication, and enabling the disabled antenna module so that the disabled antenna module is used in communication when the measured temperature is decreased to be lower than a second threshold.

The performing of the beam search may include selecting one or more antenna modules for performing the beam search from among the plurality of antenna modules by considering at least one of the mechanical state of the electronic device and the shape in which the user grips the electronic device.

The performing of the beam search may include selecting one or more antenna modules for performing the beam search by considering directions of the plurality of beams formable by the plurality of antenna modules.

The selecting of the at least two antenna modules capable of forming a beam with the same direction may include selecting one antenna module out of the at least two antenna modules capable of forming beams of the same direction to perform the beam search, when the at least two antenna modules among the plurality of antenna modules are capable of forming beams of the same direction at a folding angle of the electronic device.

The communicating by alternately using the selected at least two antenna may include selecting an additional antenna module for the communication from among one or more antenna modules not selected from among the plurality of antenna modules. The additional antenna module may be an antenna module capable of forming a beam in the same direction as a direction of a beam formed for communication by the selected at least two antenna modules among the one or more antenna modules not selected.

In various embodiments proposed in the disclosure, the method preferentially performs communication by using a single antenna module before alternately using the plurality of antenna module, and alternately uses the plurality of antenna modules when temperature of the single antenna preferentially in use is increased to be higher than or equal to a threshold.

Figure 18A:
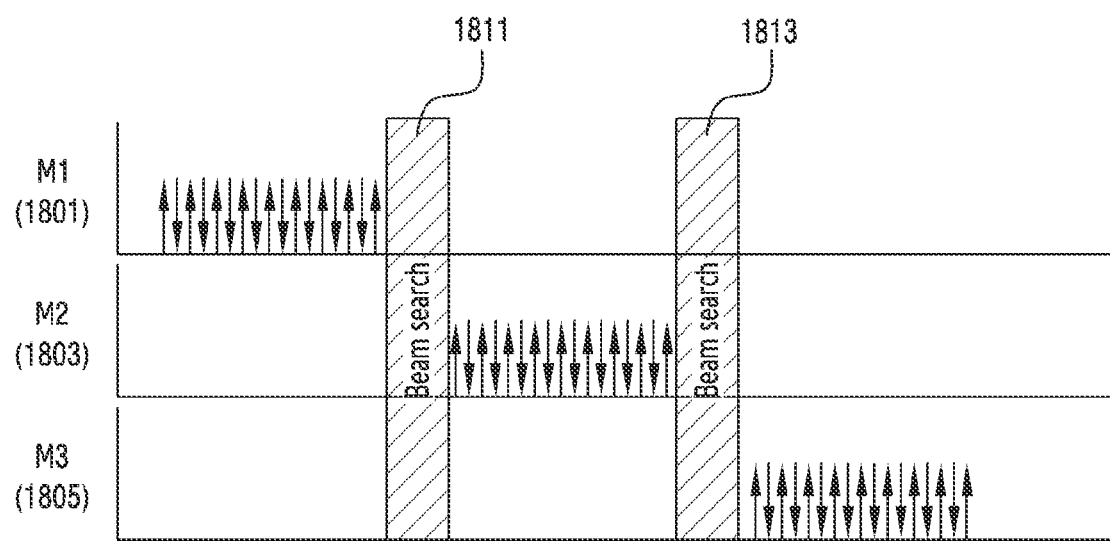
FIG. 18A and FIG. 18B illustrate a continuous communication time using beamforming in an electronic device.
Figure 18B:
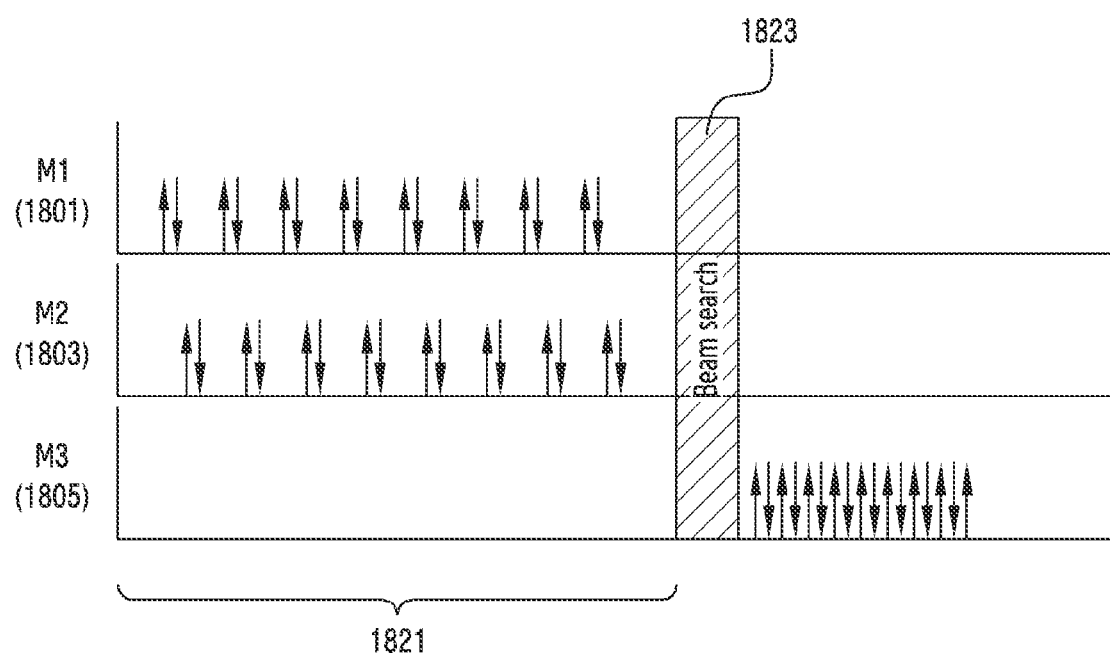

FIG. 18A and FIG. 18B illustrate a continuous communication time using beamforming in an electronic device FIG. 18A illustrates a continuous communication time using beamforming in an electronic device, according to the conventional technique. FIG. 18B illustrates a continuous commination time using beamforming in an electronic device, according to an embodiment of the present disclosure.

Referring to FIG. 18A, the electronic device may communicate by using a beam with highest channel quality among a plurality of beams, and thus may communicate by using an antenna module M1 1801 having the beam. When the antenna module M1 1801 is overheated, the electronic device may disable the antenna module M1 1801, re-perform a beam search 1811, and communicate by selecting an antenna module M2 1803, based on a result of the beam search 1811. When the antenna module M2 1803 is overheated, the electronic device may disable the antenna module M2 1803, re-perform a beam search 1813, and communicate by using an antenna module M3 1805, based on a result of the beam search 1813.

The electronic device may perform the beam search 1811 and/or 1813 for re-selecting an antenna module due to the overheating of the antenna module in use not at a specified time but even during communication. For example, the electronic device may perform the beam search using the antenna module M2 1803 and/or the antenna module M3 1805 periodically or aperiodically during communication using the antenna module M1 1810. In this case, upon detecting a heating situation (overheating) at the antenna module M1 1801 in use, the electronic device dose not perform the beam search (e.g., 1811 or 1813) separately, but may disable the antenna module M1 1801 and then communicate by selecting another antenna module (e.g., 1803 or 1805) immediately, based on a result of the beam search performed frequently during communication using the antenna module M1 1801.

Referring to FIG. 18B, the electronic device 101 may select at least two antenna modules M1 1801 and M2 1803 satisfying a specified condition, and may communicate by alternately using beams of the selected antenna modules M1 1801 and M2 1803. The electronic device 101 may alternately use the selected antenna module M1 1801 and M2 1803 and thus may communicate by using the selected antenna module M1 1801 and M2 1803 for a longer time than in the conventional technique. For example, according to various embodiments of the disclosure, since the selected antenna module M1 1801 and M2 1803 are alternately used, a time 1821 for continuously using beams of the selected antenna module M1 1801 and M2 1803 may be increased. The increased time 1821 may lead to an increase in communication possibility by allowing beam coverage of the electronic device 101 to be maintained. Therefore, the electronic device 101 according to various embodiments of the disclosure may obtain an effect of increasing a continuous communication time using beamforming.

Figure 19A:
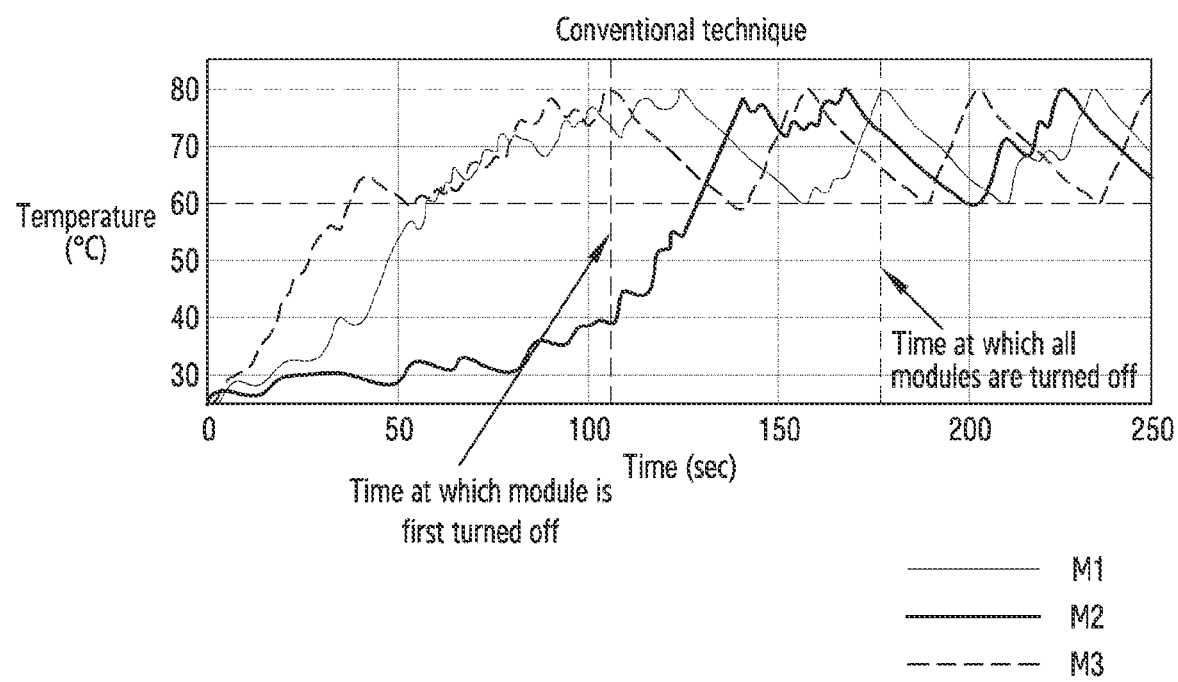
FIG. 19A and FIG. 19B illustrate a temperature graph of an antenna module for a case where an electronic device communicates while moving.
Figure 19B:
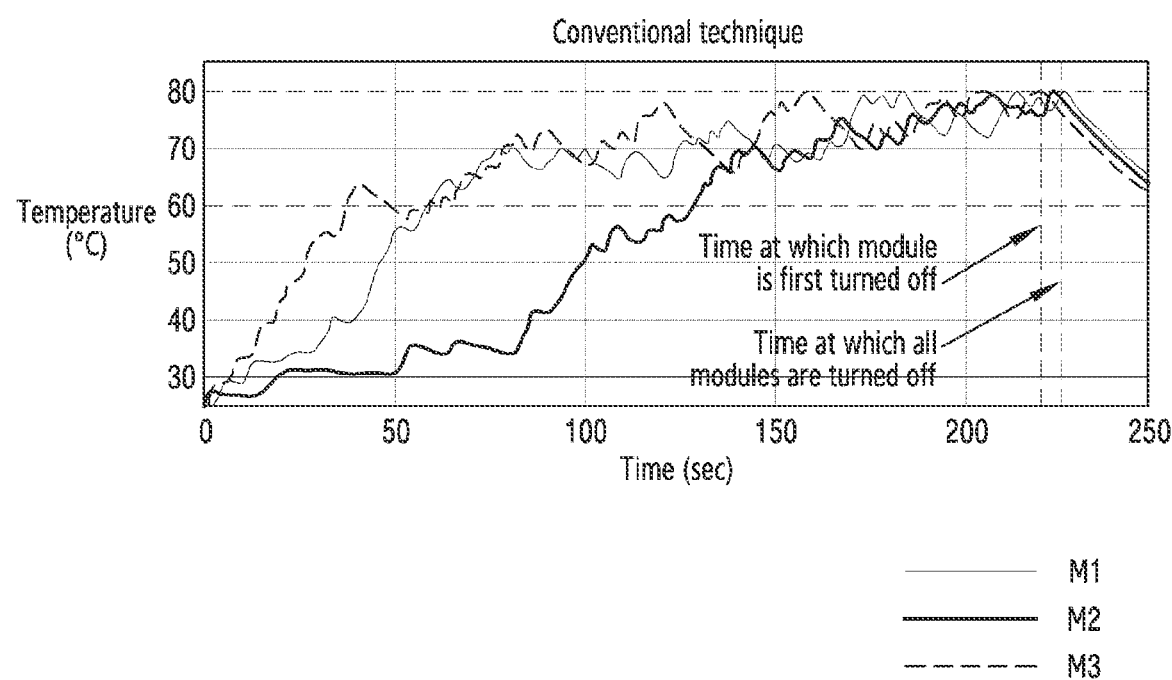

FIG. 19A and FIG. 19B illustrate a temperature graph of a plurality of antenna modules for a case where an electronic device communicates while moving. FIG. 19A is a temperature graph of an antenna module for a case where an electronic device communicates while moving, according to the conventional technique. FIG. 19B is a temperature graph of an antenna module for a case where an electronic device communicates while moving, according to various embodiments of the disclosure.

Referring to FIG. 19A, according to the conventional technique, one antenna module is disabled for the first time (when about 106 second elapse) in the electronic device due to overheating when 100 seconds elapse, and all antenna modules M1, M2, and M3 are disabled (when about 178 seconds elapse) due to overheating at a time between 150 seconds and 200 seconds.

Referring to FIG. 19B, according to an embodiment, one antenna module is disabled for the first time (when about 222 seconds elapse) in the electronic device 101 due to overheating when 200 seconds elapse, and all antenna modules M1, M2, and M3 are disabled (when about 228 seconds elapse) due to overheating at a later time. That is, the electronic device 101 according to various embodiments of the disclosure maintains communication for a longer time than the electronic device according to the conventional technique.

Figure 20A:
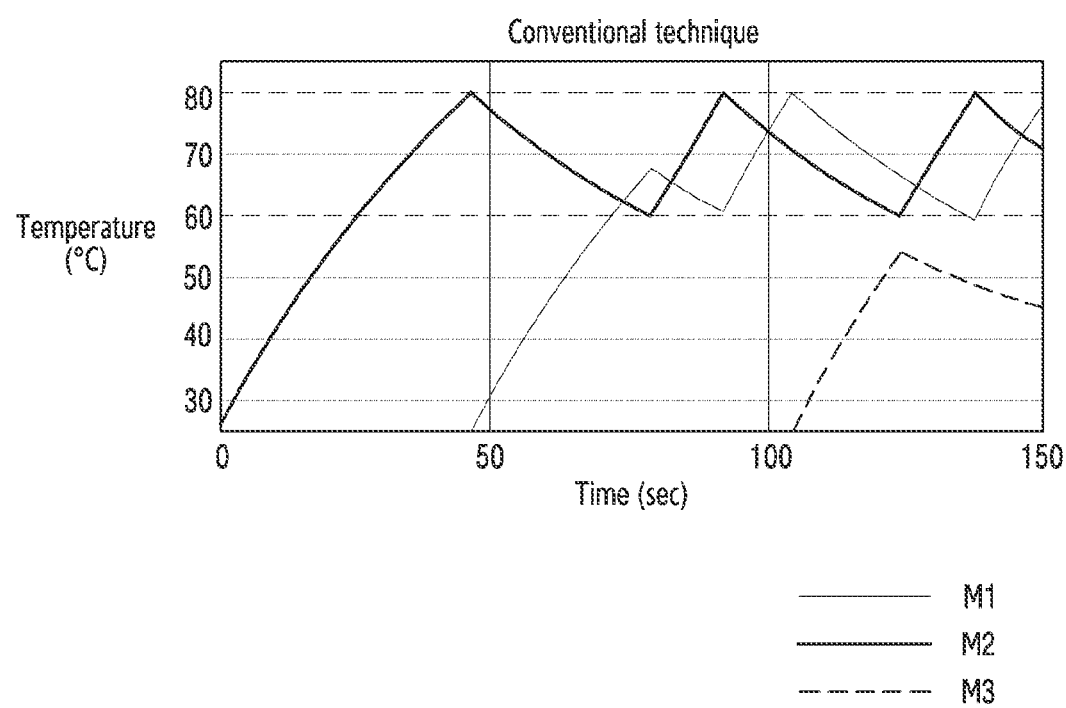
FIG. 20A and FIG. 20B illustrate a temperature graph of an antenna module for a case where an electronic device communicates at a fixed position.
Figure 20B:
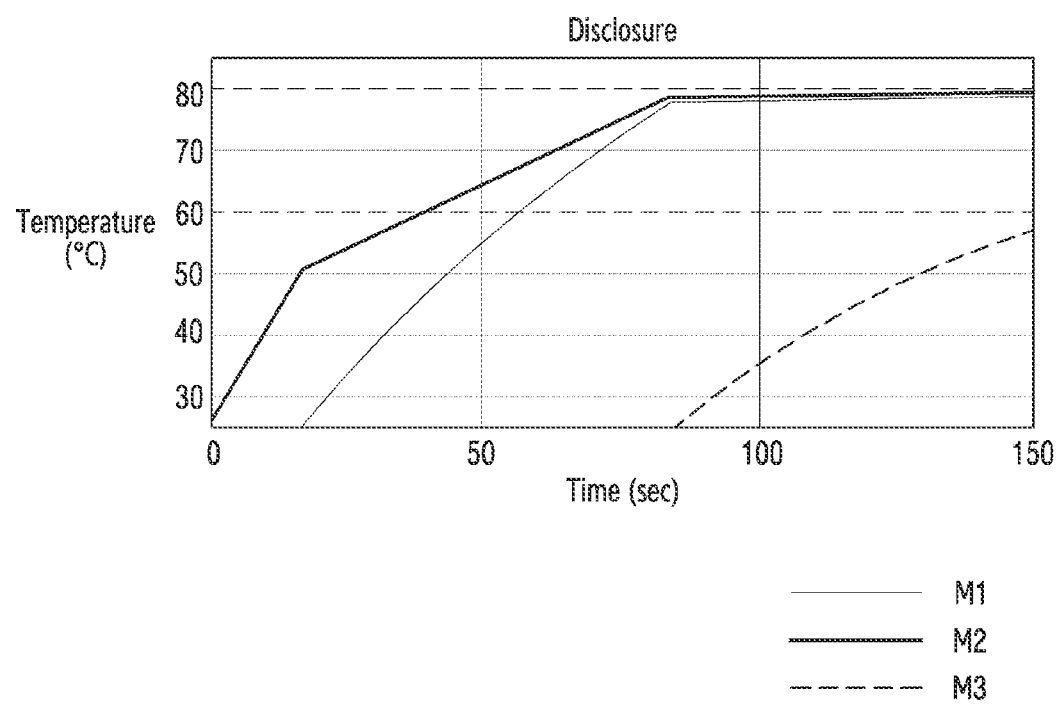

FIG. 20A and FIG. 20B illustrate a temperature graph of a plurality of antenna modules for a case where an electronic device communicates at a fixed position. FIG. 20A illustrates a temperature graph of an antenna module for a case where an electronic device communicates at a fixed position, according to the conventional technique. FIG. 20B illustrates a temperature graph of an antenna module for a case where an electronic device communicates at a fixed position, according to an embodiment of the present disclosure.

Referring to FIG. 20A, according to the conventional technique, one antenna module is disabled for the first time due to overheating when even 50 seconds do not elapse, and another antenna module is also disabled due to overheating when 100 seconds elapse.

Referring to FIG. 20B, according to an embodiment, two antenna modules are disabled in the electronic device 101 due to overheating when 80 seconds elapse. That is, advantageously, the electronic device 101 maintains wider communication coverage than a conventional electronic device, extending a time in which even one antenna module is disabled.

The electronic devices may include, for example, a portable communication device (e.g., a smartphone), a computer device, a portable multimedia device, a portable medical device, a camera, a wearable device, or a home appliance, and are not limited to those described above.

It should be appreciated that various embodiments and the terms used therein are not intended to limit the technological features set forth herein to particular embodiments and include various changes, equivalents, or replacements for a corresponding embodiment.

With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order).

If an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

In accordance with the above-described embodiments of the disclosure, an electronic device may communicate by using, alternately or by turn, a plurality of antenna modules having a beam satisfying specified channel quality, thereby minimizing an overheating phenomenon caused by a continuous use of the antenna module and improving continuity of a communication time.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed:

1. A device, comprising:
   a plurality of antenna modules disposed at different locations and configured to support beamforming;
   a communication module configured to transmit and receive a signal through the plurality of antenna modules;
   one or more processors; and
   memory storing instructions that, when executed by the one or more processors, cause the device to:
   perform a beam search on the plurality of antenna modules;
   select at least two antenna modules among the plurality of antenna modules allowing a beam satisfying a specified condition to be formed among the plurality of antenna modules, based on a result of the beam search, wherein the at least two antenna modules include a first antenna module and a second antenna module, and wherein the first antenna module forms a first beam and the second antenna module forms a second beam; and
   perform wireless communication by using the first beam of the first antenna module and the second beam of the second antenna module alternately at a specific time interval.

2. The device of claim 1, wherein the instructions further cause the one or more processors to:
   select a first antenna module among the plurality of antenna modules allowing a first beam satisfying a first specified condition to be formed among a plurality of beams formable by the plurality of antenna modules; and
   select a second antenna module among the plurality of antenna modules allowing a second beam satisfying a second specified condition to be formed among a plurality of beams formable by at least one antenna module other than the first antenna, wherein at least one of the first specified condition and the second specified condition includes a condition for channel quality.

3. The device of claim 1, further comprising:

a temperature sensor configured to measure temperature for the plurality of antenna modules, wherein the instructions cause the one or more processors to disable an antenna module having a temperature measured by the temperature sensor exceeding a first threshold, out of the selected at least two antenna modules so that the antenna module is not used for wireless communication, and enable the disabled antenna module so that the disabled antenna module is used in communication when the temperature measured by the temperature sensor is less than a second threshold.

4. The device of claim 1, further comprising:

at least one sensor configured to detect at least one of a mechanical state of the device or a shape of a user grip of the device, wherein the instructions cause the one or more processors to select one or more antenna modules for performing the beam search from among the plurality of antenna modules by considering the at least one of the mechanical state of the device or the shape of the user grip of the device, detected by the sensor.

5. The device of claim 1, wherein the instructions further cause the one or more processors to select one or more antenna modules for performing the beam search by considering directions of the plurality of beams formable by the plurality of antenna modules.

6. The device of claim 5, wherein the instructions further cause the one or more processors to select one antenna module out of the at least two antenna modules capable of forming beams of a same direction to perform the beam search, when the at least two antenna modules among the plurality of antenna modules are capable of forming beams of the same direction at a folding angle of the device.

7. The device of claim 1, wherein the instructions further cause the one or more processors to select an additional antenna module for the wireless communication from among one or more antenna modules not selected from among the plurality of antenna modules, and wherein the additional antenna module is capable of forming a beam in a same direction as a direction of a beam formed for communication by the selected at least two antenna modules among the one or more antenna modules not selected.

8. A method of operating a device, the method comprising:

performing a beam search on a plurality of antenna modules among the plurality of antenna modules included in the device;

selecting at least two antenna modules allowing a beam satisfying a specified condition to be formed among the plurality of antenna modules, based on a result of the beam search wherein the at least two antenna modules include a first antenna module and a second antenna module, and wherein the first antenna module forms a first beam and the second antenna module forms a second beam; and performing wireless communication by using the first beam of the first antenna module and the second beam of the second antenna module alternately at a specific time interval.

9. The method of claim 8, wherein the selecting of the at least two antenna modules comprises:

selecting a first antenna module among the plurality of antenna modules allowing a first beam satisfying a first specified condition to be formed among a plurality of beams formable by the plurality of antenna modules; and selecting a second antenna module among the plurality of antenna modules allowing a second beam satisfying a second specified condition to be formed among a plurality of beams formable by at least one antenna module other than the first antenna module among the plurality of antenna modules, wherein at least one of the first specified condition and the second specified condition includes a condition for channel quality.

10. The method of claim 8, wherein the performing wireless communication by alternately using the selected at least two antenna modules comprises:

measuring temperature for the plurality of antenna modules;

disabling an antenna module having a measured temperature exceeding a first threshold, out of the selected at least two antenna modules so that the antenna module is not used for wireless communication; and enabling the disabled antenna module so that the disabled antenna module is used for wireless communication when the measured temperature is less than a second threshold.

11. The method of claim 8, wherein the performing of the beam search comprises selecting one or more antenna modules for performing the beam search from among the plurality of antenna modules by considering at least one of a mechanical state of the device or a shape of a user grip of the device.

12. The method of claim 8, wherein the performing of the beam search comprises selecting one or more antenna modules for performing the beam search by considering directions of the plurality of beams formable by the plurality of antenna modules.

13. The method of claim 12, wherein the selecting of the at least two antenna modules comprises selecting one antenna module out of the at least two antenna modules capable of forming beams of a same direction to perform the beam search, when the at least two antenna modules among the plurality of antenna modules are capable of forming beams of the same direction at a folding angle of the device.

14. The method of claim 8, wherein performing wireless communication by alternately using the selected at least two antenna comprises selecting an additional antenna module for the communication from among one or more antenna modules not selected from among the plurality of antenna modules, and wherein the additional antenna module is an antenna module capable of forming a beam in a same direction as a direction of a beam formed for communication by the selected at least two antenna modules among the one or more antenna modules not selected.

* * * * *